(12) United States Patent
Lay et al.

(10) Patent No.: US 11,920,697 B2
(45) Date of Patent: Mar. 5, 2024

(54) FAILSAFE MODULE

(71) Applicant: ROTORK CONTROLS LIMITED, Bath (GB)

(72) Inventors: Stuart Lay, Bath (GB); James Hopwood, Bath (GB)

(73) Assignee: ROTORK CONTROLS LIMITED, Bath (GB)

( * ) Notice: Subject to any disclaimer, the term of this patent is extended or adjusted under 35 U.S.C. 154(b) by 49 days.

(21) Appl. No.: 17/598,081

(22) PCT Filed: Mar. 25, 2020

(86) PCT No.: PCT/GB2020/050796
§ 371 (c)(1),
(2) Date: Sep. 24, 2021

(87) PCT Pub. No.: WO2020/193973
PCT Pub. Date: Oct. 1, 2020

(65) Prior Publication Data
US 2022/0186856 A1 Jun. 16, 2022

(30) Foreign Application Priority Data
Mar. 25, 2019 (GB) ..................... 1904106

(51) Int. Cl.
*F16K 31/52* (2006.01)
*F16D 41/10* (2006.01)
(Continued)

(52) U.S. Cl.
CPC ........ *F16K 31/5282* (2013.01); *F16D 41/105* (2013.01); *F16K 31/055* (2013.01);
(Continued)

(58) Field of Classification Search
CPC .. F16K 31/5282; F16K 31/055; F16K 31/535; F16K 31/56–566; F16D 41/105; F16P 3/008
See application file for complete search history.

(56) References Cited

U.S. PATENT DOCUMENTS

| 4,113,063 A * | 9/1978 | Troy ..................... F16K 31/055 74/625 |
| 4,533,114 A | 8/1985 | Cory et al. |

(Continued)

FOREIGN PATENT DOCUMENTS

| DE | 102013223907 A1 | 6/2015 |
| GB | 2383627 A | 7/2003 |

(Continued)

*Primary Examiner* — Marina A Tietjen
(74) *Attorney, Agent, or Firm* — Dickinson Wright PLLC; Andrew D. Dorisio

(57) ABSTRACT

A failsafe module comprising an input member (310), an output member (312), and a coupling mechanism for coupling the input member to the output member. The coupling mechanism comprises an intermediate member (316*a*) movable relative to the output member to energise an energy storage device and a latch mechanism (318, 320) to hold the energy storage device in an energised state. When the latch mechanism is engaged, the input and output members are coupled together and the energy storage device is held in an energised state and isolated from the coupling between the input and output members. When the latch mechanism is released, the energy storage device can release its energy to drive the output member to a predetermined position.

27 Claims, 22 Drawing Sheets

(51) Int. Cl.
- *F16K 31/05* (2006.01)
- *F16K 31/528* (2006.01)
- *F16K 31/53* (2006.01)
- *F16K 31/56* (2006.01)
- *F16P 3/00* (2006.01)

(52) U.S. Cl.
CPC .......... *F16K 31/535* (2013.01); *F16K 31/566* (2013.01); *F16P 3/008* (2013.01)

(56) References Cited

U.S. PATENT DOCUMENTS

| | | |
|---|---|---|
| 10,197,141 B2 | 2/2019 | Armstrong |
| 2009/0301238 A1* | 12/2009 | Wintsch ................. F16H 35/00 74/89.17 |
| 2018/0038266 A1 | 2/2018 | Nonnenmann et al. |

FOREIGN PATENT DOCUMENTS

| | | | |
|---|---|---|---|
| KR | 20230041094 A * | 3/2023 | |
| WO | WO-2020193973 A1 * | 10/2020 | ........... F16D 41/105 |

* cited by examiner

FAILSAFE MODULE

FIELD OF INVENTION

The present invention relates to a failsafe module that can be used, for example, to actuate a valve to a safe operating position in an emergency event.

BACKGROUND OF INVENTION

In valve actuation there are circumstances in which there is a need for a valve to be operated in the case of an emergency. These emergencies may be caused by a loss of site power, or can cause a loss of site power. An emergency may cause an emergency shutdown command (ESD) to be generated. In such situations it is critical for safety that the valve moves to a safe position, either open or closed as required.

Many of the existing systems rely on a spring being permanently coupled to both the output of the actuator and the input of the valve. On power loss, the spring back-drives the actuator to close the valve. This has the effect of putting heavy stress through the actuator. Another consideration is that the actuator must be strong enough to operate both the spring and the valve for each valve operation. The spring will also be stress-cycled with each valve operation.

A spring return is conventionally used as part of a coupling in a self-contained valve unit. However, conventional designs tend to involve a serious compromise in the sizing of the actuator and the sizing of the valve. Many of these systems are also only designed to work with one particular actuator design.

Further systems available attach the spring only to the input of the valve. This allows the actuator to be disconnected but the actuator still must be strong enough to operate both the spring and the valve for each valve operation. The additional issue of stress-cycling the spring remains.

Systems to overcome these limitations have in the past have been complex and have involved separate motors and actuators to rewind or manage the springs.

Another consideration is that the force provided by a spring will drop off as the spring discharges. In current systems, this drop off in force is mitigated by oversizing the spring at the fully compressed condition. This then requires an oversizing of the valve components and the actuator so that it is able to move against the extra load of the spring compression.

There is therefore a need to provide a more efficient and more reliable coupling between an actuator and a valve that can perform a safety function in the event of an emergency.

STATEMENTS OF INVENTION

According to a first aspect of the invention, there is provided a failsafe module comprising:
  an input member;
  an output member movable toward and away from a predetermined position; and,
  a coupling mechanism for coupling the input member to the output member, the coupling mechanism comprising:
    an intermediate member engaged with the input member and movable by the input member between a first position and a second position;
    an energy storage device acting between the output member and the intermediate member, such that movement of the intermediate member relative to the output member from the first position to the second position energises the energy storage device, and wherein the energy storage device, the output member, and the intermediate member are engaged such that a release of energy from the energy storage device drives the output member to the predetermined position; and,
    a latch mechanism having an engaged state in which the latch mechanism prevents relative movement between the intermediate member and the output member when the intermediate member is in the second position, to thereby hold the energy storage device in an energised state and to thereby couple the input member to the output member, and the latch mechanism having a released state in which the latch mechanism allows relative movement between the intermediate member and the output member, to thereby allow the energy storage device to be energised or to release energy.

This arrangement thus allows the energy storage device to be isolated from the coupling between the input and output members once the latch mechanism is in the engaged state. In this way, the operation of charging the energy storage device and the operation of actuating a component (e.g. a valve) coupled to the failsafe module are separated. Therefore, an actuator coupled to the failsafe module only needs to be rated for the operation which requires the greatest torque, rather than the sum of the torque required for both operations. Furthermore, the energy storage device is not stress cycled during each valve operation, thereby increasing the lifespan and reliability of the energy storage device.

In the context of the failsafe module being coupled to a valve, the predetermined position of the output member may be the position of the output member that corresponds to a position of the valve that is considered safe in an emergency (e.g. open or closed).

The latch mechanism can comprise a first latch member and a second latch member, wherein the first latch member and the second latch member are configured to couple or engage when the intermediate member is in the second position. One of the first latch member and the second latch member can be an electromagnet and the other of the first latch member and the second latch member can be ferromagnetic.

The latch mechanism can further comprise a clutch assembly configured to couple the input member to the output member when the latch mechanism is in the engaged state. The clutch assembly can comprise a clutch mounted to the output member, and an engagement member mounted to an upper radial surface of the input member and circumferentially offset from the clutch when the intermediate member is in the first position. Movement of the intermediate member from the first position to the second position by the input member can bring the clutch into alignment with the engagement member.

The clutch can be configured to engage with the engagement member when in alignment and the latch mechanism is in the engaged state, to thereby couple the input member to the output member. The clutch can be configured to disengage from the engagement member when the latch mechanism is in the released state, to thereby allow relative movement between the intermediate member and the output member.

The clutch can comprise an input pin and an output pin. The input pin and the output pin can each comprise bearings. The output pin can pivotally mount the clutch to the output member. The engagement member can comprise a block having a groove. The groove can extend radially across the block, and comprise two side walls. The side walls of the groove can be relatively divergent. As an example, one side wall can be substantially vertical, and the other side wall can be angled with respect to the substantially vertical side wall. The input pin is configured to engage with the groove, to thereby couple the input member to the output member. The relatively divergent side walls of the groove can be configured such that the axially upwards force of the spring is constantly trying to disengage the input pin from the groove by rolling the bearings up the angled side of the groove.

In alternative embodiments, the latch mechanism can comprise a first latch member on the output member and a second latch member on the intermediate member.

The input member can be coupled to the output member via the intermediate member. Alternatively or additionally, the input member can be coupled to the output member via the latch mechanism.

In embodiments of the failsafe module:
the energy storage device applies a linear force between the intermediate member and the output member;
linear movement of the intermediate member relative to the output member from the first position to the second position energises the energy storage device; and
the latch mechanism, in the engaged state, is configured to prevent relative linear movement between the intermediate member and the output member, and, in the released state, allows relative linear movement between the intermediate member and the output member.

The input member, output member and the intermediate member can be rotatable and co-axial about a common axis and the energy storage device can apply the linear force between the intermediate member and the output member in a direction parallel to the common axis.

Optionally:
the input member and output member both comprise surfaces extending parallel to the common axis;
the axial surface of the input member defines a circumferential edge extending radially across the axial surface of the input member;
the axial surface of the output member defines an axial edge extending radially across the axial surface of the output member;
the input member and output member are nested and arranged such that the circumferential edge and the axial edge are angled relative to each other and overlap in the radial direction;
the intermediate member comprises an arm extending radially across the circumferential edge and the axial edge, such that movement of the arm is constrained by the circumferential edge and the axial edge; and,
the circumferential edge and the axial edge each have a component parallel to the common axis, such that when the input member is rotated relative to the output member, the constrained movement of the arm by the circumferential edge and the axial edge forces the intermediate member to move linearly relative to the output member between the first and second positions.

The surfaces extending parallel to the common axis can be cylindrical tubular walls. The circumferential edge of the input member can define an input slot, and the axial edge of the output member can define an output slot.

The output member can further comprise a base perpendicular to the common axis, and the energy storage device can be engaged between the base and the arm.

One of the circumferential edge and the axial edge can be a helical edge that extends helically about the common axis and the other of the circumferential edge and the axial edge can be a linear edge that extends parallel to the common axis.

The angle between the helical edge and a plane perpendicular to the common axis can vary along the length of the helical edge.

The angle between the helical edge and a plane perpendicular to the common axis can decrease along the length of the helical edge in the direction of the intermediate member moving from the first position to the second position.

The energy storage device can be a spring, e.g. a compression spring or an extension spring.

In some embodiments of the failsafe module:
the energy storage device is configured to apply a torque between the intermediate member and the output member;
rotational movement of the intermediate member relative to the output member from the first position to the second position energises the energy storage device; and
the latch mechanism, in the engaged state, prevents relative rotational movement between the intermediate member and the output member, and, in the released state, allows relative rotational movement between the intermediate member and the output member.

The input member, the output member and the intermediate member can be rotatable and co-axial about a common axis.

The failsafe module can further comprise a drive arrangement arranged between the intermediate member and the output member, the drive arrangement comprising:
a first drive element rotatable relative to the intermediate member; and
a second drive element rotationally fixed relative to the output member and in engagement with the first drive element;
wherein:
the energy storage device is engaged between the first drive element and the intermediate member; and
the intermediate member, the drive arrangement and the output member are engaged such that relative rotational movement between the intermediate member and the output member causes relative rotational movement between the intermediate member and the first drive element to thereby energise the energy storage device.

The first drive element can be an external gear (where the engagement surface (e.g. teeth) is formed on the outer surface of the gear relative to the common axis) and the second drive element can be an internal gear (where the engagement surface (e.g. teeth) is formed on the inner surface of the gear relative the common axis).

The pitch radius of the first drive element can vary in a circumferential direction. The pitch radius is defined as the distance between the axis of rotation of the inner gear and the effective outer surface of the inner gear. In the case of a toothed gear, the effective outer surface would be at the midpoint of the length of the teeth. Thus, the first drive element can have a non-circular shape. The pitch radius of the first drive element can increase in a circumferential direction. The pitch radius of the first drive element can increase in a circumferential direction to produce a spiral-shaped gear.

The pitch radius of the second drive element can increase by the same amount and in the same circumferential direction as the first drive element.

The coupling mechanism can comprise a plurality of energy storage devices configured to apply a torque between the intermediate member and the output member.

The drive arrangement can comprise a plurality of first drive elements and each energy storage device of the plurality of energy storage devices can be engaged between the intermediate member and a respective first drive element of the plurality of first drive elements.

The drive arrangement can comprise a plurality of second drive elements and each first drive element of the plurality of first drive elements can be engaged with a respective second drive element of the plurality of second drive elements.

The plurality of energy storage elements and/or first drive elements and/or second drive elements can be arranged symmetrically about the common axis.

The or each energy storage device can be a spring, e.g. a torsion spring, such as a spiral torsion spring.

The failsafe module of the first aspect of the invention can further comprise a damper configured to regulate the rate of movement of the output member when the latch mechanism is released, e.g. using fluidic, magnetic or frictional means.

The failsafe module can further comprise a sensor configured to detect when the latch mechanism is engaged.

The failsafe module can further comprise a sensor configured to measure the reaction force of the latch mechanism when the latch mechanism is engaged.

The failsafe module can further comprise a sensor configured to measure the force required to move the intermediate member relative to the output member from the first position to the second position to energise the energy storage device.

One of the input member and output member can comprise a single tab. The other of the input member and output member can comprise two spaced apart tabs. The single tab can be located between the spaced apart tabs, thereby limiting the range of rotation of the input member relative to the output member.

The failsafe module can further comprise:
an outer housing containing at least the input member and the output member, so that the outer housing, input member and output member are co-axial; whereby the outer housing comprises an aperture co-axial with the input member and through which a portion of the input member extends; and whereby a circumferential wall extends axially away from the outer housing around the aperture;
an actuator having an actuator housing which houses a drive mechanism; the actuator is mountable to the outer housing and configured to engage with the input member, such that the input member is rotatable by the drive mechanism; and,
a safety mechanism configured to prevent relative rotation between the actuator housing and the outer housing when the actuator is separated from the outer housing; the safety mechanism comprising:
a cover comprising a surface portion and a skirt portion, whereby the skirt portion extends around an edge of and axially away from the surface portion; and whereby the cover is mounted to the actuator housing via the surface portion, and removably mountable to the outer housing via the skirt portion; the cover is configured such that the skirt portion engages with the circumferential wall of the outer housing when the actuator is mounted to the outer housing, so that the cover and the outer housing are co-axial about the common axis;
an interlock mechanism configured to act between the circumferential wall of the outer housing and the skirt portion of the cover, such that the actuator housing and outer housing are rotationally fixed when the skirt portion of the cover is engaged with the circumferential wall of the outer housing; and,
a connector rotationally fixed to the drive mechanism, such that operation of the drive mechanism causes rotation of the connector; and wherein the connector and the cover are co-axial about the common axis;
wherein:
the connector comprises a protruding leg, which extends axially away from the connector when the actuator is mounted to the outer housing;
the portion of the input member extending through the aperture in the outer housing is configured to receive the protruding leg of the connector when the actuator is mounted to the outer housing, thereby rotationally fixing the connector and the input member, so that operation of the drive mechanism causes corresponding rotation of the input member via the connector; and,
the length of the skirt portion of the cover is longer than the length of the protruding leg of the connector, so that the protruding leg of the connector disengages from the input member before the skirt portion of the cover disengages from the wall of the outer housing when the actuator is separated from the outer housing, so that the actuator housing and the outer housing remain rotationally fixed by the interlock mechanism until the skirt portion of the cover is completely disengaged from the wall of the outer housing.

The connector can be a T-shaped connector, comprising a radial leg and an axial leg. The protruding leg can be the axial leg of the connector. The portion of the input member extending through the aperture in the outer housing can comprise a notch configured to receive the axial leg of the connector when the actuator is mounted to the outer housing, so that operation of the drive mechanism causes corresponding rotation of the input member via the connector; and whereby the length of the skirt portion of the cover is longer than the length of the axial leg of the connector.

The interlock mechanism can comprise:
a recess located on the inner surface of the skirt portion of the cover and a correspondingly shaped projection extending outwardly from the outer surface of the circumferential wall of the outer housing, and/or,
a recess located on the outer surface of the circumferential wall of the outer housing and a correspondingly shaped projection extending inwardly from the inner surface of the skirt portion of the cover;
whereby the projection is configured to engage with the recess, such that the actuator housing and outer housing are rotationally fixed when the projection and recess are engaged.

The projection can be a cylindrical peg located within a groove in either one or both of the inner surface of the skirt portion of the cover and the outer surface of the circumferential wall of the outer housing, whereby the diameter of the peg is greater than the depth of the groove, so that the peg extends either radially inwardly from the inner surface of the skirt portion of the cover and/or radially outwardly from the outer surface of the circumferential wall of the outer housing.

The failsafe module can further comprise:
a collar comprising an inner part having an axially extending aperture, and an outer part extending radially outwardly from the inner part and substantially around a portion of the circumference of the inner part, whereby the collar is configured to fit around a portion of the input member, such that the input member and the collar are co-axial about a common axis, and the input member and collar are rotationally fixed when the collar is fitted to the input member; and, a stop located in the rotational path of the outer part when the collar is fitted to the input member, such that rotation of the collar relative to the stop causes a circumferential end of the outer part to engage with the stop, thereby limiting the range of rotation of the collar and thereby the input member;

wherein the outer part comprises a first circumferential end configured to engage with the stop before the energy storage device is energised, thereby preventing rotation of the input member in a first direction while the energy storage device is not energised; and wherein the outer part comprises a second circumferential end configured to move towards the stop as the energy storage device is energised by rotating the input member in a second direction, and whereby rotation of the input member in the first direction and the second direction is permitted by the collar once the energy storage device is energised and the latch mechanism engaged.

Rotation of the input member in the first direction can cause the output member to move to a position that corresponds to a position of the valve that is considered unsafe. That is, rotation in the first direction can move the valve away from the safe position. Rotation of the input member in the second direction can cause the output member to move to a position that corresponds to a position of the valve that is considered safe. That is, rotation in the second direction can move the valve towards and into the safe position. Therefore, the presence of the collar can prevent the valve from being moved away from the safe position until the energy storage device has been energised.

The aperture can comprise a lip configured to interlock with a corresponding indent on the input member when the collar is fitted to the input member, thereby preventing relative rotation between the input member and the collar.

The failsafe module can further comprise:
a lock nut configured to releasably secure the collar to the input member; the lock nut comprising a head having a unique configuration; and,
a key having a corresponding unique configuration, such that the lock nut is tightened or released only when the key having the corresponding unique configuration engages with and rotates the lock nut, to thereby secure or remove the collar from the input member.

The lip can comprise a first fixing hole extending axially through the lip, and the corresponding indent on the input member comprises a floor having a second fixing hole, such that the first and second fixing holes are aligned when the collar is fitted to the input member; and whereby the collar is secured to the input member when the lock nut is received within the aligned first and second fixing holes and tightened by the key.

According to a second aspect of the invention, there is provided an actuator comprising a failsafe module according to the first aspect of the invention. The actuator can be configured to actuate the input member of the failsafe module. The actuator can be electrically operated or manually operated. The failsafe module can be permanently attached to the actuator, or can be removably attached to the actuator.

According to a third aspect of the invention, there is provided a valve assembly comprising:
a failsafe module according to the first aspect of the invention; and,
a valve coupled to the output member of the failsafe module.

The valve can be coupled to the output member of the failsafe module such that movement of the output member toward and away from the predetermined position moves the valve toward and away from a "safe" operating position. The valve assembly can further comprise an actuator coupled to the input member of the failsafe module.

BRIEF DESCRIPTION OF THE DRAWINGS

The invention will now be described, by way of example only, with reference to the accompanying drawings, in which.

DETAILED DESCRIPTION OF THE DRAWINGS

Figure 1:
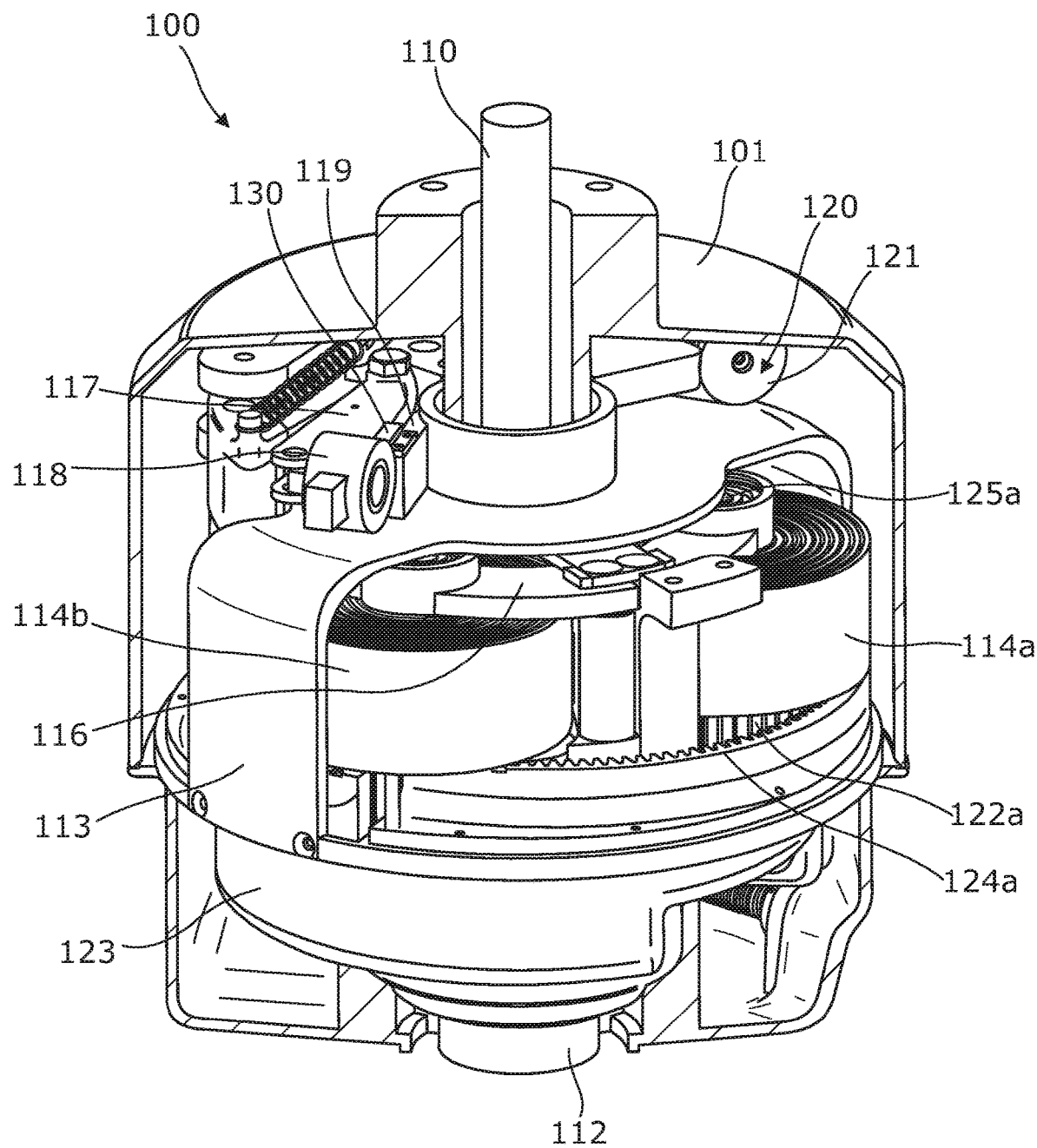
FIG. 1 shows a perspective view of a failsafe module.

FIG. 1 shows a failsafe module 100 having an outer housing 101 which houses an input member 110 rotatable relative to the housing 101 and an output member 112 rotatable relative to the housing 101. The input member 110 and the output member 112 are arranged at opposing ends of the housing 101. The input member 110 and the output member 112 are both generally in the form of a cylindrical shaft and are co-axial about a common axis and rotatable about the common axis. The outer housing 101 also houses a coupling mechanism that can selectively couple the input member 110 to the output member 112. The coupling mechanism comprises an intermediate member 116, three energy storage devices 114a, 114b, 114c, a drive arrangement 122, 124, and a latch mechanism 118, 120.

The intermediate member 116 is arranged co-axially with the input member 110 and is coupled and rotationally fixed relative to the input member 110 so that rotation of the input member 110 causes corresponding rotation of the intermediate member 116 about the common axis.

The three energy storage devices 114a, 114b, 114c are in the form of three spiral torsion springs. Each spiral torsion spring is generally in the form of a flat ribbon of metal that is wound in a planar spiral from an inner radial end to an outer radial end. Each spiral torsion spring can be energised by rotating the inner end relative to the outer end in the direction of the spiral. The torsion springs 114a, 114b, 114c are arranged regularly on the intermediate member 116 about the common axis.

The outer end of each spiral torsion spring 114a, 114b, 114c is mounted on the intermediate member 116. The inner end of each spiral torsion spring 114a, 114b, 114c is mounted to a respective shaft 125a, 125b, 125c that is arranged parallel to the common axis and is rotatably mounted on the intermediate member 116 such that each shaft 125a, 125b, 125c may rotate relative to the intermediate member 116. As such, when the intermediate member 116 rotates about the common axis, each shaft (and hence each spiral torsion spring as a whole) revolves about the rotational axis of the intermediate member 116, but each torsion spring 114a, 114b, 114c may also rotate about its own axis (corresponding to the longitudinal axis of the shaft 125a, 125b, 125c) relative to the intermediate member 116.

In particular, each torsion spring 114a, 114b, 114c may be energised by rotating each shaft 125a, 125b, 125c relative to the intermediate member 116, which causes the inner end of each torsion spring to rotate relative to the outer end of each torsion spring. As will be described below, each shaft 125a, 125b, 125c is coupled to the drive arrangement which is coupled to the output member 112. Thus, each spiral torsion spring 114a, 114b, 114c acts between the intermediate member 116 and the output member 112 (via the drive arrangement).

The drive arrangement provides a mechanism for energising each spiral torsion spring 114a, 114b, 114c when the intermediate member 116 is rotated relative to the output member 112.

The drive arrangement comprises three inner gears 122a, 122b, 122c and three outer gears 124a, 124b, 124c. Each inner gear is in engagement with an outer gear to form three pairs of gears. Each inner gear 122a, 122b, 122c is mounted on a respective shaft 125a, 125b, 125c such that the rotational axis of each inner gear corresponds to the longitudinal (rotational) axis of its respective shaft. Each outer gear 124a, 124b, 124c is mounted on the output member 112 and is rotationally fixed relative to the output member 112 such that the outer gears 124a, 124b, 124c and the output member 112 rotate together about the common axis.

Each outer gear 124a, 124b, 124c is an external gear (i.e. has teeth pointing radially inward) and each inner gear 122a, 122b, 122c is an internal gear (i.e. has teeth pointing radially outward). The inner gears and the outer gears are arranged similar to an epicyclic (planetary) gear arrangement but without a sun gear. Each outer gear 124a, 124b, 124c is in the form of a partial ring or curved rack and the outer gears are arranged on the output member 112 such that they form an approximate annulus or ring about the common axis that surrounds the inner gears 122a, 122b, 122c. With this arrangement, rotation of the intermediate member 116 about the common axis causes the inner gears 122a, 122b, 122c to revolve about the common axis while also causing each inner gear to rotate about its own rotational axis due to the engagement with each outer gear.

The inner gears 122a, 122b, 122c and the outer gears 124a, 124b, 124c are designed with a gear ratio such that rotation of the intermediate member 116 relative to the output member 112 causes each inner gear 122a, 122b, 122c to rotate about its own rotational axis at a different rate than the rate of rotation of the intermediate member 116 about the common axis. Because the inner end of each spiral torsion spring 114a, 114b, 114c is rotationally fixed relative to a respective inner gear 122a, 122b, 122c and the outer end of each spiral torsion spring is rotationally fixed relative to the intermediate member 116, this difference in the rate of rotation between the intermediate member 116 and each inner gear 122a, 122b, 122c causes the inner end of each spiral torsion spring 114a, 114b. 114c to rotate relative to outer end of each torsion spring, which winds (energises) or unwinds (de-energises) each spiral torsion spring, depending on the direction of relative rotation.

Figure 2:
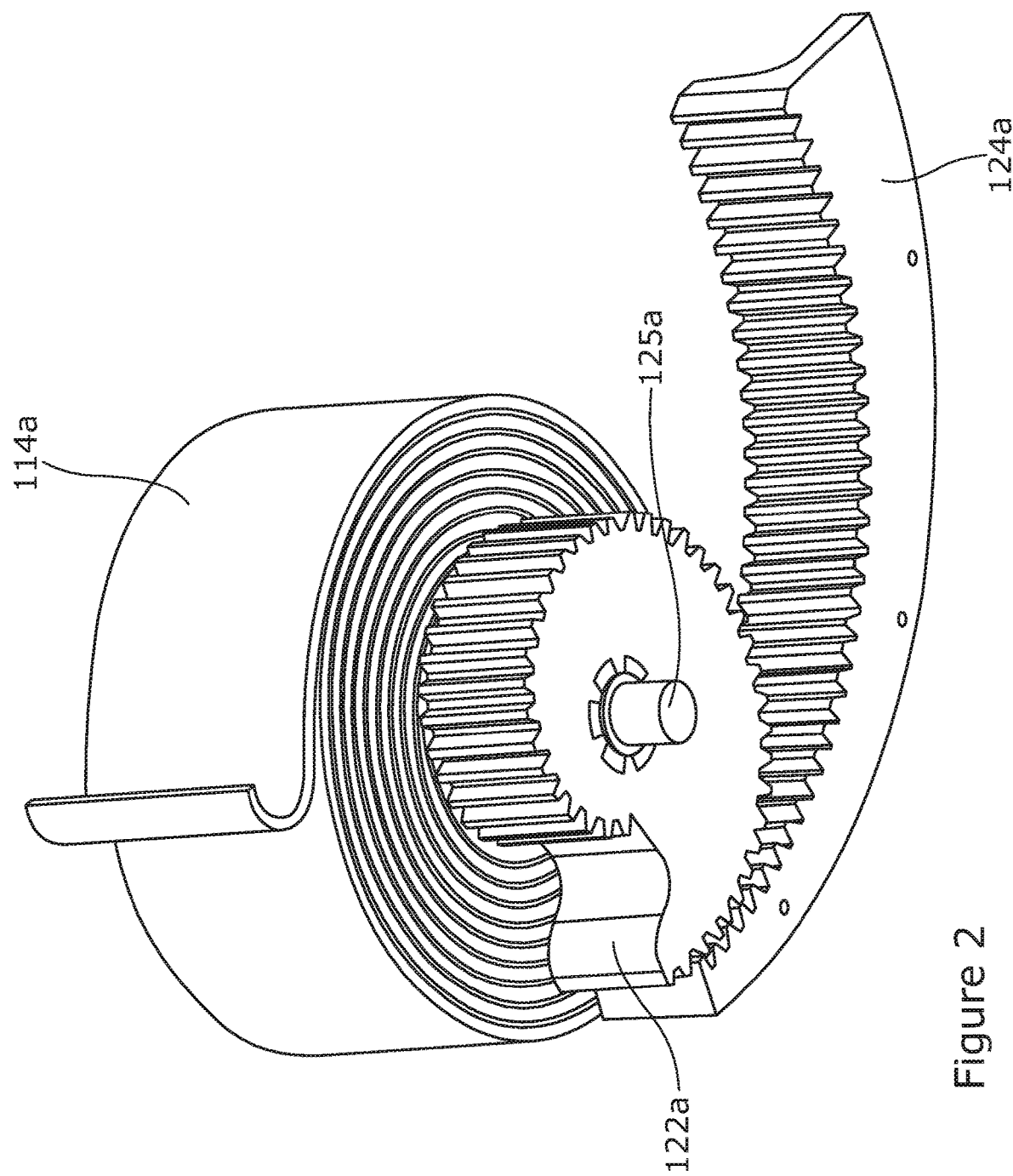
FIG. 2 shows a partial perspective view of a drive arrangement of the failsafe module of FIG. 1 as viewed from below.
Figure 3:
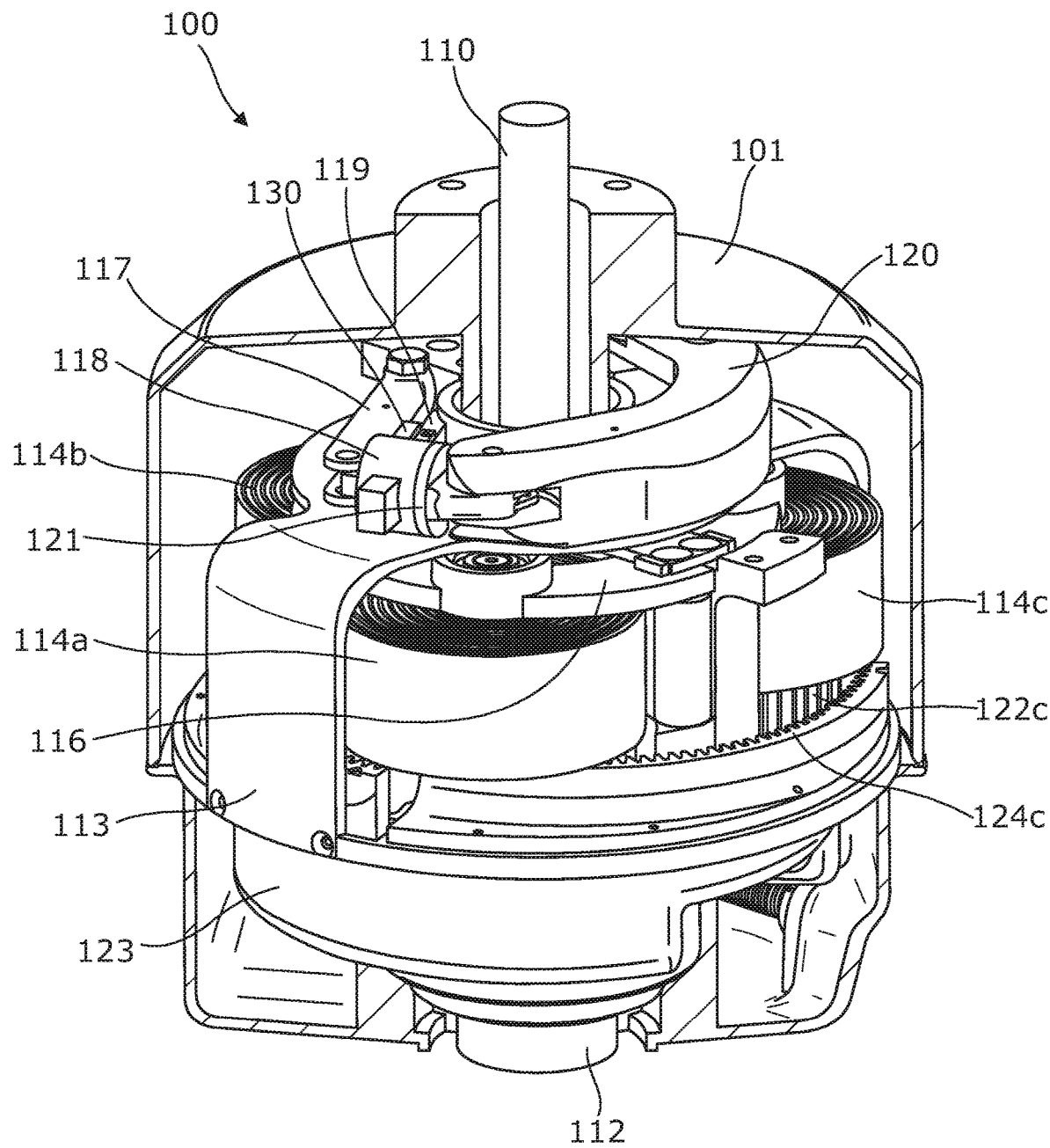
FIG. 3 shows a perspective view of the failsafe module of FIG. 1.

FIG. 2 shows an example arrangement of a spiral torsion spring 114a, a shaft 125a, an inner gear 122a and an outer gear 124a. The other spiral torsions springs 114b, 114c, shafts 125b, 125c, inner gears 122b, 122c and outer gears 124b, 124c are arranged in identical arrangements about the common axis.

Each inner gear 122a, 122b, 122c is in the form of a non-circular spur gear having a pitch radius that varies in the circumferential direction. In other words, the distance between the rotational axis of each inner gear and the effective outer surface of each inner gear varies in the circumferential direction. In the case of a toothed gear, the effective outer surface would be at the midpoint of the length of the teeth. In particular, the pitch radius of each inner gear increases in a circumferential direction to produce a spiral shape.

Each outer gear 124a, 124b, 124c is in the form of a partial ring, or a curved rack gear with teeth pointing radially inward. Similar to the inner gears, the pitch radius of each outer gear 124a, 124b, 124c also varies in the circumferential direction. In other words, the distance between the rotational axis of each outer gear (corresponding to the rotational axis of the output member 112, i.e. the common axis) and the effective inner surface of each outer gear varies in the circumferential direction. In the case of a toothed gear, the effective inner surface would be at the midpoint of the length of the teeth. In particular, the pitch radius of each outer gear increases in a circumferential direction to produce a curved wedge shape.

The pitch radius of each inner gear 122a, 122b, 122c and each outer gear 124a, 124b, 124c increase in the same circumferential direction and by the same amount so that each inner gear and outer gear pair remain engaged when the intermediate member 116 is rotated relative to the output member 112.

In FIG. 2, the components are shown in a position before a charging operation has begun to energise the spiral torsion spring 114a. In this configuration, the pitch radii of the inner gear 122a and outer gear 124a at their contact point are at their greatest. Using the bottom perspective view of FIG. 2 as the frame of reference, movement of the spiral torsion spring 114a and shaft 125a along the outer gear 124a from left to right (caused by rotation of the intermediate member 116 relative to the output member 112) causes clockwise rotation of the inner gear 122a about the rotational axis of the inner gear 122a. As explained above, the inner gear 122a rotates about its rotational axis at a different rate compared to the rotation of the intermediate member 116 about its rotational axis. This causes the spiral torsion spring 114a to wind about the shaft 125a, thereby energising the spiral torsion spring 114a.

If the inner gear 122a had a uniform pitch radius (i.e. if the inner gear were circular), an increasing reaction torque would be applied by the outer gear 124a at the contact point between the inner gear 122a and outer gear 124a (as described by Hooke's law) as the spiral torsion spring becomes more and more energised. This would result in an increasing input torque being required to complete the winding operation of the spiral torsion spring 114a. However, due to the spiral shape of the inner gear 122a, the distance between the rotational axis of the inner gear 122a (corresponding to the axis of the spring 114a) and the contact point between the inner gear 122a and the outer gear 124a decreases as the inner gear 122a rotates along the outer gear 124a. This decrease in distance to the contact point compensates for an increasing reaction torque that would be applied by the output gear 124a at the contact point as the spring is wound tighter. Thus, by decreasing the pitch radius of the inner gear 122a appropriately, the torque required to wind the torsion spring 114a can be made approximately constant throughout the winding operation.

In a similar but reverse manner, this drive arrangement also allows a constant torque to be applied by the spiral torsion spring 114a between the intermediate member 116 and the output member 112 as it unwinds (releases its stored energy). In particular, a drop-off in output torque as the torsion spring 114a unwinds may be compensated by the increase in the distance from the rotational axis of the inner gear 122a (corresponding to the axis of the spring 114a) and the contact point between the inner gear 122a and the outer gear 124a. Thus, an approximately constant torque can be applied by the spiral torsion spring 114a between the intermediate member 116 and the output member 112 (via the drive arrangement) during unwinding of the spiral torsion spring 114a.

Thus, the drive arrangement of the failsafe module 100 provides a variable gear ratio arrangement that allows the input torque required to energise the spiral torsion springs 114a, 114b, 114c and the output torque applied between the intermediate member 116 and the output member 112 as the spiral torsion springs release their energy to be made approximately constant. Other variations in the pitch radius of the inner gear may be used to provide a desired torque input or output.

The coupling mechanism also comprises a latch mechanism for releasably holding the energy storage devices (torsion springs 114a, 114b, 114c) in an energised state. The latch mechanism comprises a first latch member in the form of an electromagnet 118 mounted on the output member 112 and a second latch member in the form of a latch arm 120 mounted on the intermediate member 116.

The latch arm 120 comprises a ferromagnetic portion 121 that can be attracted to the electromagnet 118 when turned on. The latch arm 120 is rotationally fixed relative to the intermediate member 116 so that rotation of the intermediate member 116 about the common axis causes corresponding rotation of the latch arm 120 about the common axis.

The electromagnet 118 is mounted to the output member 112 via a mounting plate 113 and a magnet arm 117. The mounting plate 113 extends from the output member 112 in the axial direction over and around the torsion springs 114a, 114b, 114c toward the intermediate member 116. The mounting plate 113 is rotationally fixed relative to the output member 112 so that rotation of the output member 112 about the common axis causes corresponding rotation of the mounting plate 113 about the common axis. One end of the magnet arm 117 is mounted to the mounting plate 113, and the electromagnet 118 is mounted to the other end of the magnet arm 117. Thus, the electromagnet 118 is rotationally fixed relative to the output member 112 such that rotation of the output member 112 about the common axis causes corresponding rotation of the electromagnet 118 about the common axis.

The coupling mechanism is configured such that when the latch mechanism is not engaged (i.e. the electromagnet 118 and latch arm 120 are not magnetically coupled) and the failsafe module 100 is at rest, the electromagnet 118 and ferromagnetic portion 121 of the latch arm 120 are spaced away from each other in the circumferential direction. Thus, when the intermediate member 116 is rotated relative to the output member 112, the electromagnet 118 and latch arm 120 are brought closer together until the intermediate member 116 reaches a coupling position at which the electromagnet 118 and latch arm 120 can magnetically couple. At the same time, relative rotation between the intermediate member 116 and the output member 112 causes each spiral torsion spring 114a, 114b, 114c to become energised (as explained above). Therefore, once the intermediate member 116 reaches the coupling position, the spiral torsion springs 114a, 114b, 114c are in an energised state. Because the electromagnet 118 is mounted on the output member 112 and the latch arm 120 is mounted on the intermediate member 116, magnetic coupling of the electromagnet 118 and the latch arm 120 prevents relative rotational movement between output member 112 and the intermediate member 116. In particular, the magnetic coupling is strong enough to completely counter the torque being applied between the intermediate member 116 and the output member 112 by the spiral torsion springs 114a, 114b, 114c and therefore activation of the latch mechanism (i.e. magnetically coupling between the electromagnet 118 and the latch arm 120) prevents the spiral torsion springs 114a, 114b, 114c from releasing their energy.

Therefore, once the latch mechanism is engaged, the input member 110 and the output member 112 are effectively coupled via the intermediate member 116 and are rotationally fixed relative to each other. Furthermore, because the latch mechanism prevents relative rotation between the intermediate member 116 and the output member 112, no work can be done against or by the spiral torsion springs 114a, 114b, 114c, and therefore the latch mechanism effectively isolates the torque of the spiral torsion springs from the coupling between the input member 110 and the output member 112.

Once the latch mechanism is engaged and is then subsequently released, the intermediate member 116 is no longer rotationally fixed relative to the output member and the spiral torsion springs 114a, 114b, 114c are free to release their stored energy by unwinding. This operation will be described in more detail below in relation to the "safety operation" of the failsafe module 100.

Optionally, the mounting arm 117 is pivotally mounted on the intermediate member 116 such that rotation of the intermediate member 116 about the common axis causes corresponding rotation of the electromagnet 118 about the common axis, but the electromagnet 118 can also move relative to the output member 112 about the pivot of the magnet arm 117. Furthermore, a hard stop 119 is provided at a circumferential position between the magnet arm 117 and the latch arm 120. The magnet arm 117 is biased away from the hard stop 119 in the circumferential direction by, for example, a spring (not shown in the figures). Thus, once the intermediate member 116 is rotated to the coupling position, the magnet arm 117 and the latch arm 120 are initially spaced apart. Then, when the electromagnet 118 is activated, the magnet arm 117 moves about its pivot against the biasing force until the magnet arm 117 reaches the hard stop 119 and the electromagnet 118 and latch arm 120 can magnetically couple.

This arrangement is particularly useful when combined with a sensor 130 positioned between the hard stop 119 and the magnet arm 117. The sensor 130 may be of an on/off type or an analogue load sensing type. When the magnet arm 117 is in its at-rest position (spaced away from the hard stop 119), the sensor 130 is not activated. When the electromagnet 118 is activated and pivots toward the latch arm 120 to couple to it, the magnet arm 117 abuts the hard stop 119 and presses against the sensor 130, which activates it. The signal from sensor 130 can be used to determine whether the latch mechanism is active. Alternatively, a sensor could be positioned at the at-rest position of the magnet arm 117 for detecting when the magnet arm 117 has moved away from it.

Thus, with this arrangement, the latch mechanism is only detected as being engaged when both the intermediate member 116 has reached the coupling position and the electromagnet 118 has been activated and has successfully coupled to the latch arm 120 (rather than only one of these conditions being true). However, this arrangement is not essential and the failsafe module 100 will still work as intended if the latch arm 120 contacts the electromagnet 118 as soon as the intermediate member 116 reaches the coupling position.

In addition to sensor 130, other sensors may be provided to detect, for example, the torque required to wind the spiral torsion springs 114a, 114b, 114c. This would allow the health of the springs to be monitored and any variation from the expected torque could be reported. A sensor could also be provided to measure the reaction force trying to pull the electromagnet 118 and latch arm 120 apart (when coupled), which will give an on-going indication of the health of the failsafe module. Wired or wireless communication features may be provided to relay signals from the sensor(s) to a controller.

The failsafe module 100 further comprises an optional damper 123 for regulating the rotational velocity of the output member 112 when energy is released from the spiral torsion springs 114a, 114b, 114c. The damper 123 surrounds the output member 112 and regulates the rate of rotation of the output member 112 using conventional fluid, magnetic or frictional means.

Operation of the failsafe module 100 will now be described.

The input member 110 of the failsafe module 100 can be coupled to an actuator for actuating the input member 110, and the output member 112 can be coupled to a valve for being actuated by the output member 112. The valve will have an operating position (e.g. open or closed) which is considered "safe" in an emergency situation. The valve can be actuated by the output member 112 toward and away from this "safe" position.

In use, the failsafe module 100 can undergo three main operations—a charging operation, a normal operation and a safety operation. These operations will now be described in turn, in the context the input member 110 being coupled to an actuator and a valve being coupled to the output member 112.

The charging operation is used to energise the spiral torsion springs 114a, 114b, 114c. At the beginning of the charging operation, the valve is at a hard stop safe position, the output member 112 is at a predetermined angular position corresponding to the safe position of the valve, the spiral torsion springs 114a, 114b, 114c are not energised (or they may have a certain preload) and the latch mechanism is not engaged (i.e. the electromagnet 118 and the latch arm 120 are not magnetically coupled).

The electromagnet 118 is then activated and the input member 110 is rotated about the common axis in the same direction that the output member 112 would need to rotate in order to move the valve to its safe position. In the view of FIG. 1, this direction is clockwise. Clockwise rotation of the input member 110 causes clockwise rotation of the intermediate member 116 toward the coupling position. Rotation of the input member 110 and intermediate member 116 in the clockwise direction would also rotate the output member 112 in the clockwise direction but the output member 112 is prevented from rotating because the valve is at its hard stop safe position. Thus, the input member 110 and the intermediate member 116 rotate relative to the output member 112. As explained above, this causes the spiral torsion springs 114a, 114b, 114c to wind up and become energised.

Once the intermediate member 116 reaches the coupling position, the electromagnet 118 and the latch arm 120 magnetically couple and the latch mechanism is engaged. Once the latch mechanism is engaged, the spiral torsion springs are held in their energised state, the failsafe module 100 is considered "charged", and the failsafe module 100 can undergo normal operation.

Figure 4:
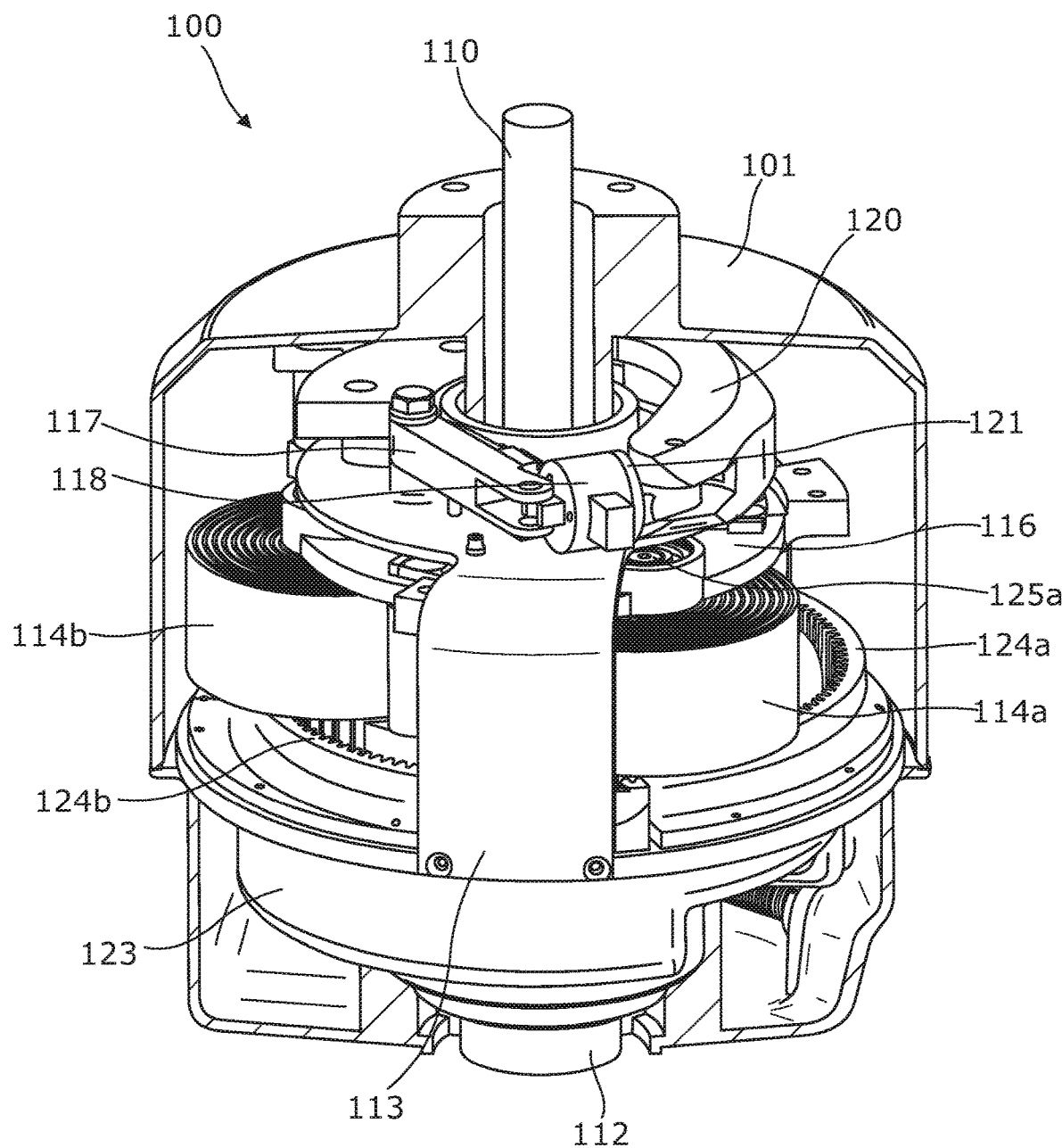
FIG. 4 shows a perspective view of the failsafe module of FIG. 1.

FIG. 4 shows the charged failsafe module 100 in a mid-stroke position during normal operation. During normal operation, as explained above, the input member 110 and the output member 112 are coupled via the intermediate member 116 and are rotationally fixed relative to each other. Therefore, any work done on the input member 110 is directly transferred to the output member 112 such that rotation of input member 110 causes corresponding rotation of the output member 112. The valve can therefore be actuated between its operating positions by actuating the input member 110. Furthermore, because the latch mechanism prevents the intermediate member 116 and the output member 112 from moving relative to each other, no work is being done against or by the spiral torsion springs 114a, 114b, 114c during normal operation.

During normal operation, an emergency situation may occur wherein, for example, power to the electromagnet 118 is lost; an emergency shutdown signal is sent to the electromagnet 118 to turn it off; or a standing emergency shutdown signal to the electromagnet 118 is removed, causing it to turn off.

In this situation, a safety operation occurs in which the latch mechanism is released so that the intermediate member 116 can now move relative to the output member and the spiral torsion springs 114a, 114b, 114c are free to release their stored energy by unwinding. This unwinding results in a torque being applied between the intermediate member 116 and the output member 112 (via the drive mechanism) so that they are driven to rotate in opposite directions toward their respective starting positions from the start of the charging operation. For the output member 112, this starting position corresponds to the predetermined position at which the valve is at its safe position, and therefore release of the latch will result in the valve being driven to its safe position.

The spiral torsion springs 114a, 114b, 114c have enough energy stored such that the unwinding of the spiral torsion springs drives the output member 112 to its starting position regardless of the angular position of the output member 112 when the latch is released.

The actuator coupled to the input member 110 may be non-backdrivable, in which case, the release of the latch results in rotation of only the output member 112 because the input member 110 (coupled to the intermediate member 116) will be at a hard stop. However, if the actuator is backdrivable, the spiral torsion springs can store enough energy to both rotate the output member 112 to its starting position as well as rotate the input member 110 to a hard stop of the actuator or an internal hard stop of the input member 110.

After a safety operation has taken place, the failsafe module may be recharged by performing the charging operation again.

Various modifications of failsafe module 100 will be apparent to those skilled in the art.

The coupling mechanism is not limited to having three spiral torsion springs. Any number of spiral torsion springs may be used (e.g. 1, 2, 3, 4 or 5), depending on the torque required. The preload and/or strength of the springs can also be varied. Furthermore, the energy storage device is not limited to being in the form of a spiral torsion spring, as long as energy storage device can provide a torque between the intermediate member 116 and the output member 112.

The spiral torsion springs 114a, 114b, 114c do not need to be arranged regularly or symmetrically about the common axis. For example, if one of the spiral torsion springs were to be removed, the failsafe module 100 would still function even if the remaining spiral torsion springs were not re-arranged symmetrically about the common axis.

The failsafe module 100 is not limited to having the described drive arrangement with inner and outer gears that have a varying pitch radius. Inner and outer gears having a uniform pitch radius could be used instead, which could mean that the input and output torque may vary as the springs are wound and unwound respectively. The failsafe module 100 would still work in this case, but if a constant input and output torque were still desired with uniform gears, then springs having non-linear characteristics could be used.

The failsafe module 100 is not limited to the input and output gears having interlocking teeth or a meshed engagement. Friction gears may be used instead which use surface friction to transmit motion from one gear to another.

The position of the electromagnet 118 and the latch arm 120 may be switched such that the magnet arm 117 and electromagnet 118 are mounted on the intermediate member 116 and the latch arm 120 and ferromagnetic portion 121 are mounted on the output member 112. Furthermore, the latch mechanism is not limited using electromagnetism to prevent relative movement between the intermediate member 116 to the output member 112. A mechanical latch mechanism could be used instead, for example.

Figure 5:
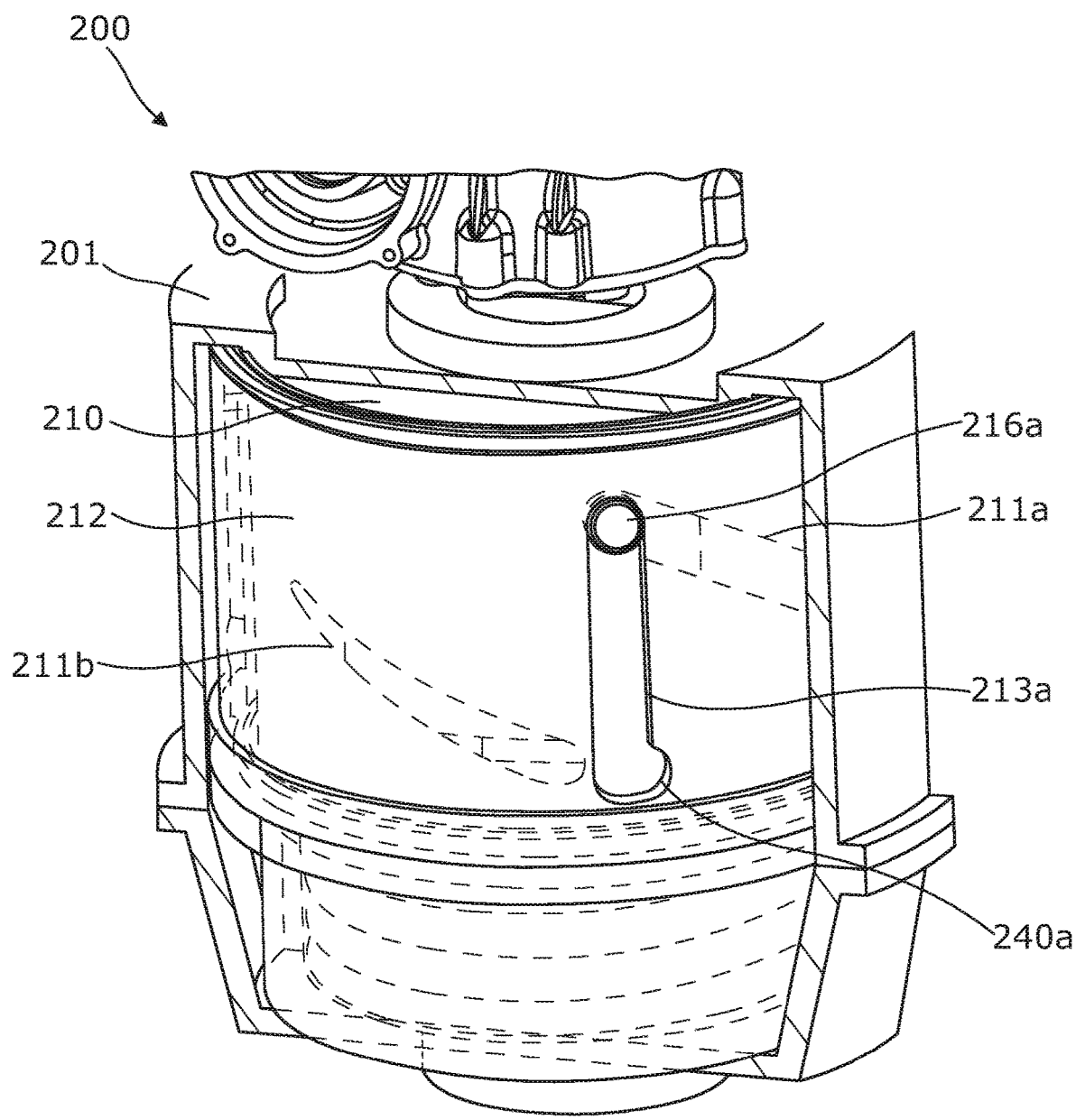
FIG. 5 shows a perspective view of another failsafe module.
Figure 6:
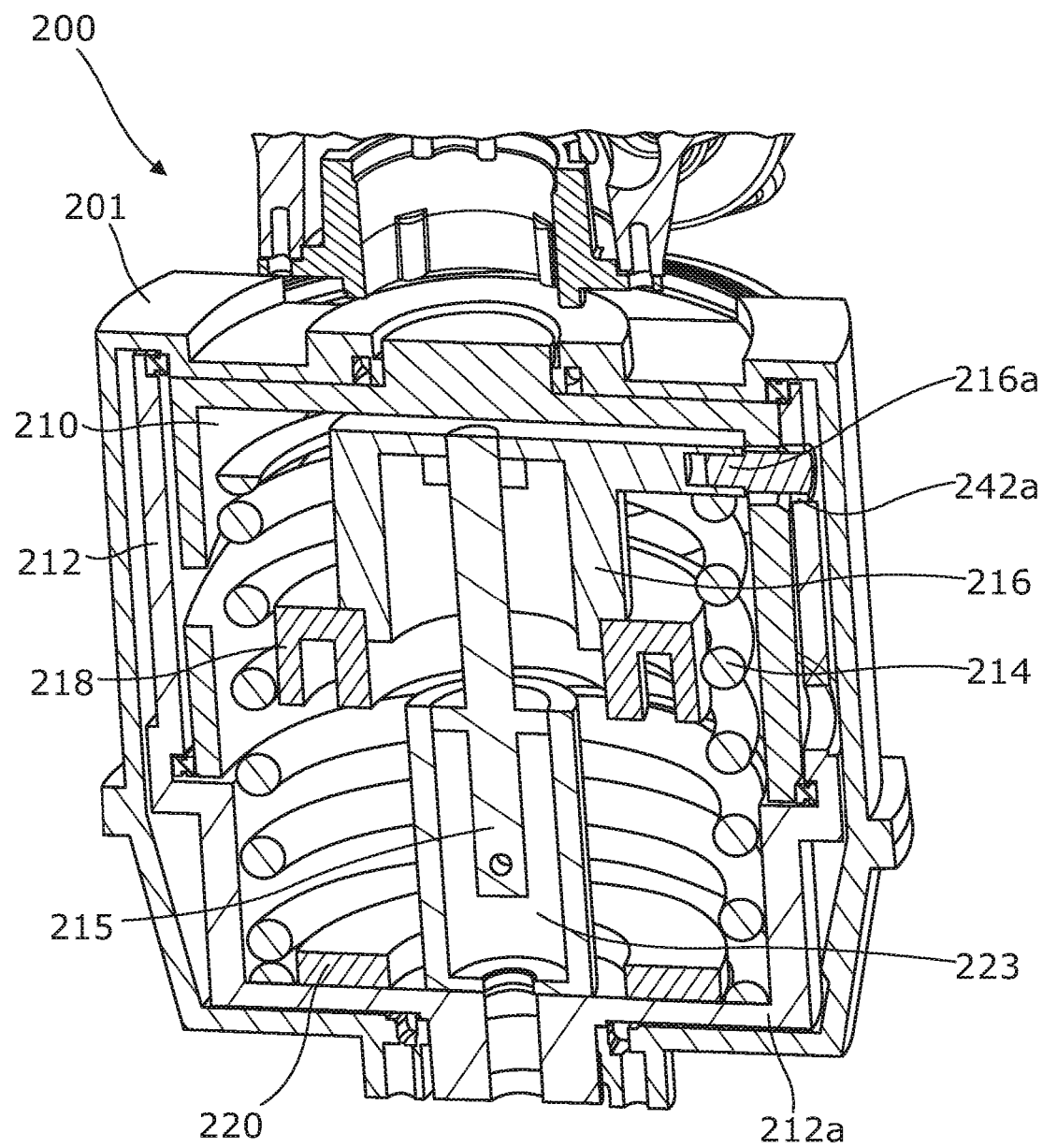
FIG. 6 shows a section view of the failsafe module of FIG. 5.

FIGS. 5 and 6 show a failsafe module 200 that works according to a similar principle to failsafe module 100, but uses a energy storage device that applies a linear force between the intermediate member and the output member, rather than a torque. Parts of the failsafe module 200 that provide a equivalent function to parts of the failsafe module 100 have the same reference numerals as those parts of the failsafe module 100, but are prefixed with the number "2", rather than the number "1".

The failsafe module 200 comprises an outer housing 201 that houses an input member 210 rotatable relative to the housing 201, an output member 212 rotatable relative to the housing 201, and a coupling mechanism that can selectively couple the input member 210 to the output member 212. In FIG. 5, the housing 201 is only partially shown so as to clearly show the input 210 and the output member 212.

The input member 210 and the output member 212 both comprise cylindrical tubular walls that are co-axial about a common axis. The term "axial" used throughout this description refers to the direction along this common axis. The input member 210 has a smaller diameter than the output member 212 and is nested within the output member 212. The output member 212 further comprises a base 212a at an axial end that extends perpendicular to the common axis. The input member 210 and the output member 212 are rotatable relative to each other about the common axis.

The tubular wall of the input member 210 defines three helical input slots or tracks 211a, 211b, 211c that extend helically about the common axis and the tubular wall of the output member 212 defines three linear axial output slots or tracks 213a, 213b, 213c that extend parallel to the common axis.

The helical input slots 211a, 211b, 211c are left-handed helices that extend partially around the circumference of the tubular wall of the input member 210 and are spaced regularly about the common axis. The axial output slots 213a, 213b, 213c are also spaced regularly on the tubular wall of the output member 212 about the common axis. The input and output slots extend radially all the way through their respective walls. The input slots 211a, 211b, 211c and the output slots 213a, 213b, 213c are arranged in pairs such that within each pair, an input slot overlaps an output slot in the radial direction when the input member 210 and the output member 212 are nested. The length of the input slots 211a, 211b, 211c in the axial direction and the length of the output slots 213a, 213b, 213c in the axial direction are substantially the same so that one end of the input and output slots overlap at a particular relative angular position of the input and output members and the other end of the input and output slots overlap at a different relative angular position of the input and output members. The input and output slots are further arranged such that during rotation of the input member 210 relative to the output member 212, an overlap is maintained between corresponding input and output slots along the length of the slots.

Each output slot 213a, 213b, 213c further comprises a small recess (notch) 240a, 240b, 240c at one end that is effectively an extension of each output slot. Recesses 240a, 240b, 240c extend in the circumferential direction at the same angle as the helical input slots 211a, 211b. The purpose of the recesses 240a, 240b, 240c will be explained further below in relation to operation of the failsafe module 200.

The failsafe module 200 further comprises a coupling mechanism nested radially within the input member 210 and output member 212. The coupling mechanism comprises an energy storage device 214, an intermediate member 216 and a latch mechanism 218, 220.

The energy storage device 214 is in the form of a spring 214, in particular a linear compression spring, arranged on the base 212a of the output member 212 and is co-axial with the input member 210 and the output member 212. The spring 214 is therefore configured to apply a force in the axial direction.

The intermediate member 216 is partially located radially inward of the spring 214 and is mounted on a shaft 215 that is co-axial with the input member 210 and output member 212. The shaft 215 allows the intermediate member 216 to both rotate about the common axis and move axially along the common axis by rotation and axial movement of the shaft 215 itself relative to the output member 212.

The intermediate member 216 comprises a central portion and three radially extending arms 216a, 216b, 216c that are spaced regularly about the common axis. The intermediate member 216 is located at the axial end of the spring 214 furthest from the base 212a of the output member 212 (i.e. above the spring 214 in the view of FIG. 6) and the arms 216a, 216b, 216c extend radially outward past the coils of the spring 214. Thus, the spring 214 is engaged between the output member 212 and the intermediate member 216, in particular between the base 212a and the arms 216a, 216b, 216c. Thus, linear movement in the axial direction of the intermediate member 216 relative to the output member 212 against the spring 214 will cause the arms 216a, 216b, 216c to push against the coils of the spring 214, causing the spring 214 to compress and become energised. Conversely, expansion of the spring 214 will cause the coils of the spring 214 to push against the arms 216a, 216b, 216c of the intermediate member 216, which will urge the intermediate member 216 to move in the axial direction.

The input member 210, output member 212 and intermediate member 216 are configured such that each arm 216a, 216b, 216c extends in a radial direction through a pair of input slots 211a, 211b, 211c and output slots 213a, 213b, 213c. The input slots and output slots will therefore constrain the rotational and axial movement of the arms and the intermediate member 216. Each arm is sized to be approximately the same width as the width of the input and output slots. At the tip of each arm 216a, 216b, 216c are bearings 242a, 242b, 242c that allow each arm to travel along its respective input slot and output slot with low friction.

The latch mechanism comprises a first latch member in the form of an electromagnet 218 and a second latch member in the form of a ferromagnetic plate 220. The electromagnet 218 is mounted to the intermediate member 216, and the ferromagnetic plate 220 is mounted to the base 212a of the output member 212. The electromagnet 218 and ferromagnetic plate 220 are arranged such that when the electromagnet 218 is switched on and the intermediate member 216 is moved axially toward the base 212a, the electromagnet 218 and intermediate member 216 are brought closer together so that they can magnetically couple.

Operation of the failsafe module 200 will now be described.

The input member 210 of the failsafe module 200 can be coupled to an actuator for actuating the input member 210, and the output member 212 can be coupled to a valve for being actuated by the output member 212. The valve will have an operating position (e.g. open or closed) in which it is considered "safe" in an emergency situation. The valve may be actuated by the output member 112 toward and away from this "safe" position.

In use, the failsafe module 200 can undergo the same three main operations as failsafe module 100—a charging operation, a normal operation and a safety operation. These operations will now be described in turn, in the context of the input member 210 being coupled to an actuator and a valve being coupled to the output member 212.

The charging operation is used to energise the spring 214. At the beginning of the charging operation, the valve is at a hard stop safe position, the output member 112 is at a predetermined angular position corresponding to the safe position of the valve, the spring 214 is not energised (or it may have a certain preload) and the latch mechanism is not engaged (i.e. the electromagnet 218 and the ferromagnetic plate 220 are not magnetically coupled). Furthermore, the intermediate member 216 is at a first axial end of the housing 201, and the arms 216a, 216b, 216c are positioned at first ends of their respective input slots 211a, 211b, 211c and first ends of their respective output slots 213a, 213b, 211c.

The electromagnet 218 is then activated and the input member 210 is rotated in the same direction as the direction that the output member 212 would need to rotate to move the valve to the safe position. In the view of FIG. 5, this direction is the clockwise direction. However, because the valve is at a hard stop in the safe position, the output member 212 is prevented from rotating in the clockwise direction and therefore the input member 210 rotates relative to the output member 212.

Figure 7:
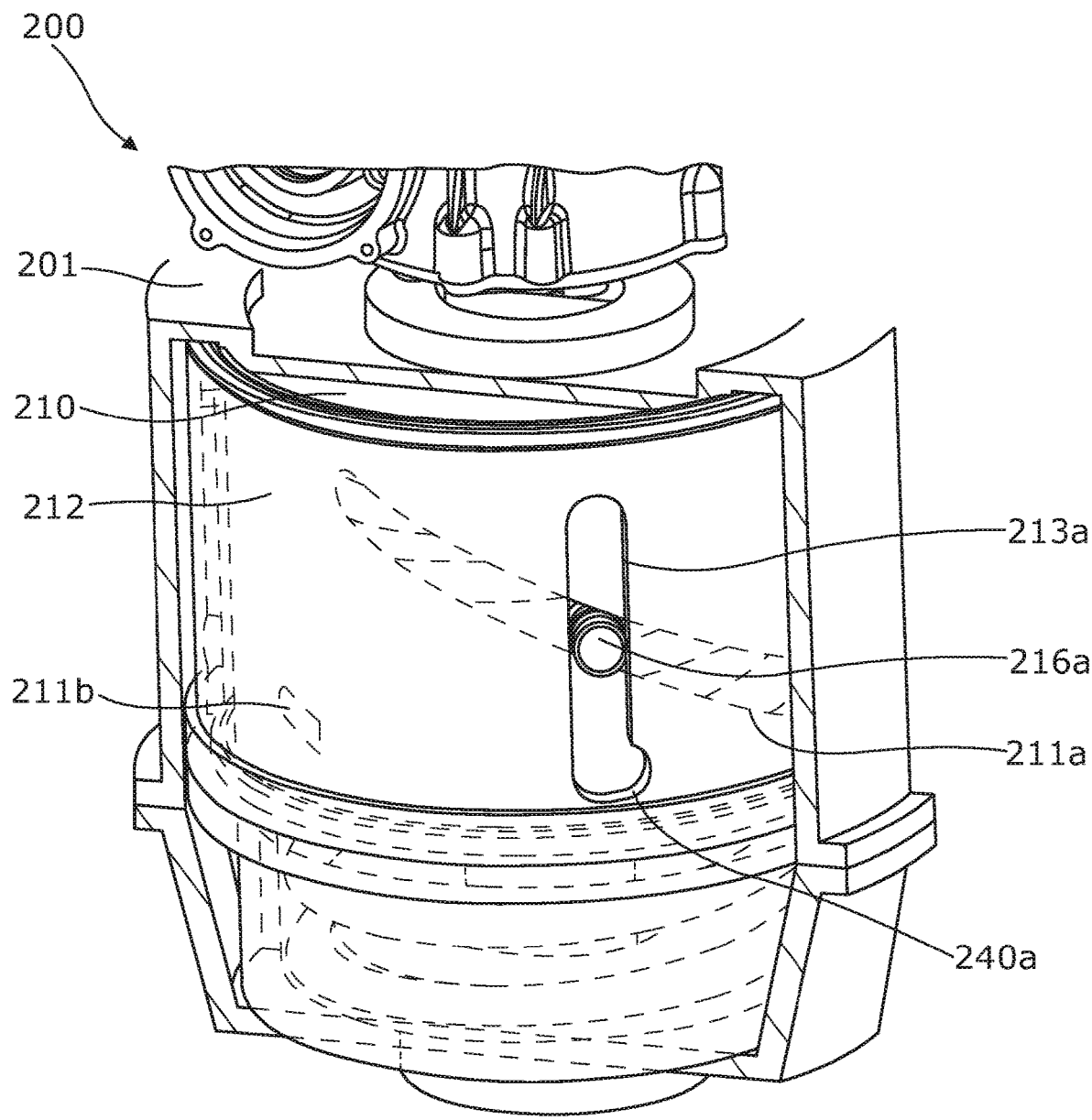
FIG. 7 shows a perspective view of the failsafe module of FIG. 5.

FIG. 7 shows the failsafe module 200 during the charging operation. As the input member 210 rotates, a torque in the clockwise direction is applied by the wall defining the helical input slots 211a, 211b, 211c to respective arms 216a. 216b, 216c. However, because the output member 212 cannot rotate any further clockwise, the arms 216a. 216b. 216c are constrained from rotating in the clockwise direction by the wall defining the axial output slots 213a, 213b, 213c. Therefore, the torque being applied to the arms 216a. 216b, 216c can only be resolved by the arms traversing down the axial output slots 213a, 213b, 213c toward the base 212a. This movement of the arms is allowed by the helical input slots 211a, 211b, 211c because helices naturally have axial direction component. Furthermore, the helical input slots are left-handed helices and therefore the arms can move "down" when the input member is rotated clockwise. This axial movement of the arms 216a. 216b, 216c (and hence the intermediate member 216) toward the base 212a causes the spring 214 to become compressed between the arms 216a, 216b, 216c and the base 212a, which results in the spring 214 becoming energised.

Figure 8:
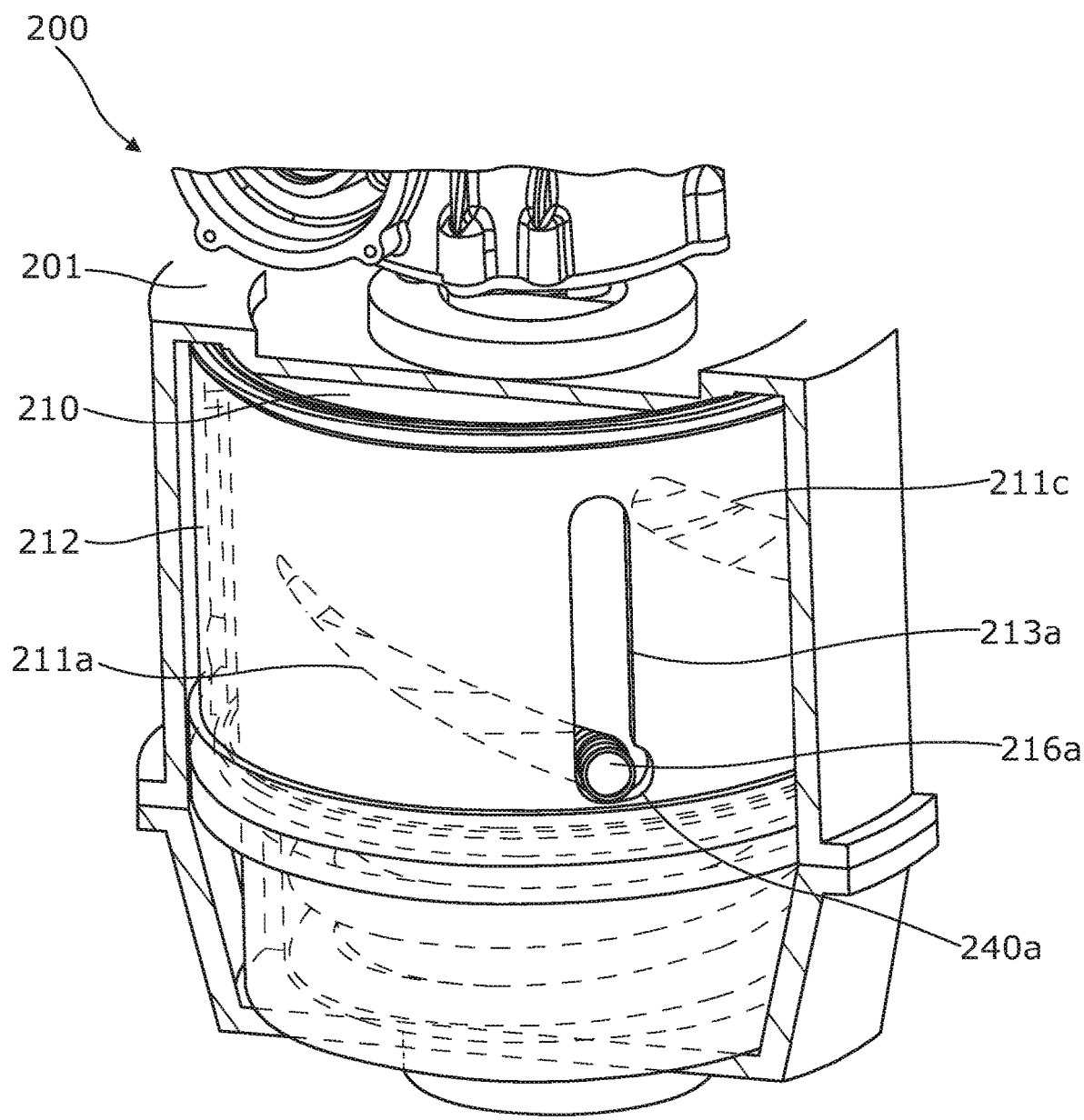
FIG. 8 shows a perspective view of the failsafe module of FIG. 5.
Figure 9:
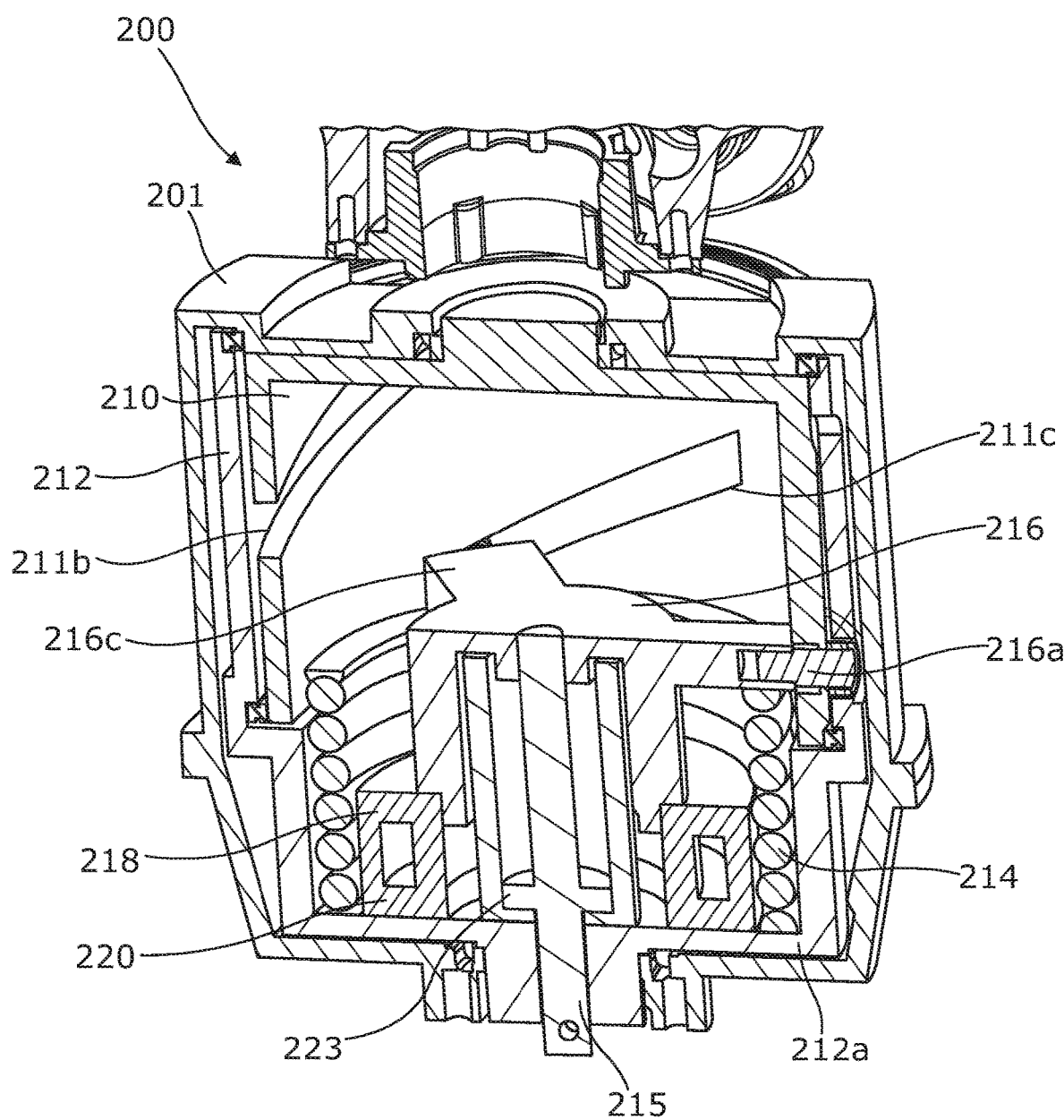
FIG. 9 shows a section view of the failsafe module of FIG. 5.

As the input member 210 continues to rotate relative to the output member 212, the intermediate member 216 continues to move axially toward the base 212a and against the spring 214 until the intermediate member 216 reaches a coupling position in which the arms 216a, 216b, 216c have reached a second end of their respective input and/or output slots, which constrains the arms from moving any further toward the base 212a in the axial direction. This position is shown in FIGS. 8 and 9.

Once the intermediate member 216 is in the coupling position, the electromagnet 218 and the ferromagnetic plate 220 are close enough to magnetically couple to each other and the latch mechanism is now engaged. The strength of the magnetic coupling is greater than the force being applied by the spring 214 between the intermediate member 216 and the output member 212 such that the intermediate member 216 cannot move axially relative to the output member 212 and therefore the spring 214 is held in its energised state. The failsafe module 200 is now considered "charged" and can undergo normal operation.

During normal operation, the input member 210 and the output member 212 are effectively coupled via the intermediate member 216 and the input member 210 and the output member 212 rotationally fixed relative to each other. This is because when the latch mechanism is engaged and the input member 210 subsequently rotates in either direction, axial movement of the intermediate member 216 is prevented by the latch mechanism, and therefore the force being applied to the arms 216a, 216b, 216c by the wall of the input member 210 defining the input slots can only be resolved by the arms rotating about the common axis. Thus, the arms 216a, 216b, 216c will rotate together with the input member 210 about the common axis. This results in the arms 216a, 216b, 216c pushing against the wall defining the axial output slots 213a, 213b, 213c, which causes the output member 212 to rotate together with the intermediate member 216 and the input member 210 about the common axis. During normal operation, work on the input member 210 is therefore directly transferred to the output member 212 such that rotation of the input member 210 causes corresponding rotation of the output member 212. The valve can therefore be actuated between its operating positions by actuating the input member 210.

Furthermore, because the latch mechanism prevents relative axial movement between the intermediate member 216 and the output member 212, no work can be done against or by the spring 214 during normal operation, and therefore the latch mechanism effectively isolates the force of the spring 214 from the coupling mechanism between the input member 210 and the output member 212.

Figure 10:
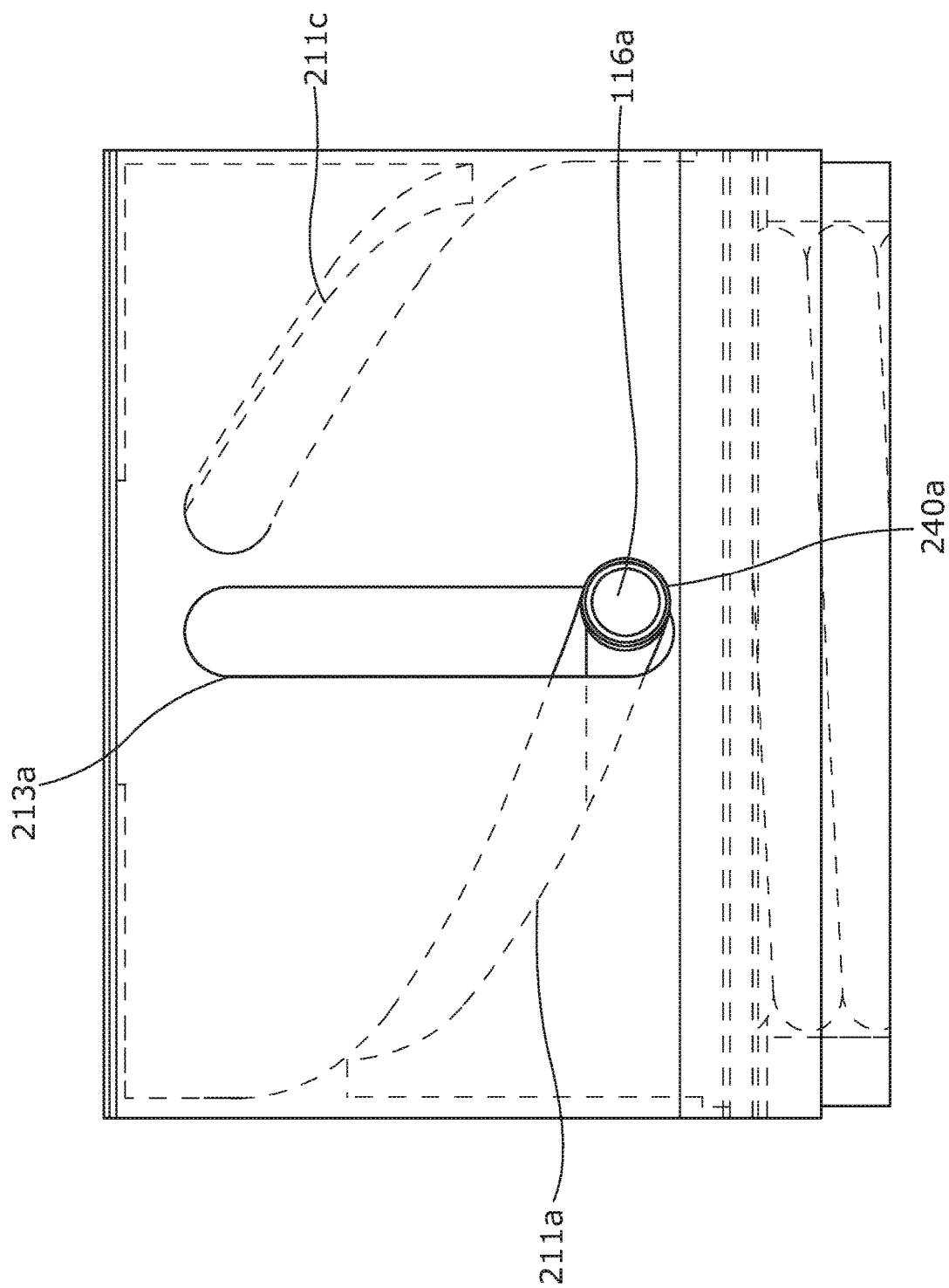
FIG. 10 shows a side view of the failsafe module of FIG. 5.

The function of the recesses will now be explained. During normal operation, as the input member 210 is rotated anti-clockwise, the arms 216a. 216b, 216c enter the recesses 240a, 240b, 240c at the second end of their respective output slots 213a, 213b, 213c. This is shown in FIG. 10. Once the arms are in their respective recesses 240a, 240b, 240c, each recess takes the axial component of the force applied to the arms 216a, 216b, 216c by the helical input slots 211a, 211b, 211c as the input member 210 rotates so that no additional force is applied to the latch mechanism. This means that the electromagnet 218 only needs to counter the force of the spring 214.

During normal operation, an emergency situation may occur wherein, for example, power to the electromagnet 218 is lost; an emergency shutdown signal may be sent to the electromagnet 218 to turn it off; or a standing emergency shutdown signal to the electromagnet 218 is removed, causing it to turn off.

In this situation, a safety operation occurs in which the latch mechanism is released so that the intermediate member 216 is no longer axially fixed relative to the output member 212 and the spring 214 is free to release its stored energy. This results in a linear force being applied between the intermediate member 216 and the output member 212 in the axial direction that acts to drive the intermediate member 216 back to its starting axial position from the start of the charging operation. This movement of the intermediate member 216 drives the input member 210 and output member 212 to rotate back to their starting angular positions from the start of the charging operation, as explained below.

Rotational movement of the input member 210 back to its starting position will be limited by an internal hard stop or a hard stop of the actuator (e.g. in the case of a non-backdrivable actuator). In any case, the spring 214 can store enough energy to provide an output force over the full movement of the output member 212 in addition to any movement of the input member 210.

Thus, upon release of the latch mechanism, and with the input member 210 being at or reaching a hard stop, the arms 216a, 216b, 216c are forced to traverse up the helical input slots 211a, 211b, 211c, causing the intermediate member 216 to rotate clockwise relative to the input member 210. The rotation of the intermediate member 216 and the arms 216a, 216b, 216c applies a torque to the wall defining the output slots 213a, 213b, causing the output member 212 to rotate clockwise with the intermediate member 216, which drives the valve to move toward its safe position.

The failsafe module 200 further comprises an optional damper 223 coupled between the shaft 215 and the output member 212 for regulating the rate of rotation of the output member 212. The damper 223 is mounted to the base 212a of the output member 212 and receives shaft 215 which can rotate and move axially relative to the damper 223. The damper 223 uses conventional fluidic, magnetic or frictional means to limit the rotational velocity of shaft 215. By regulating the rotational velocity of shaft 215, the rotational velocity of the intermediate member 216 is regulated, which in turn regulates the rotational velocity of the output member 212 during the safety operation.

FIGS. 11 to 14 show a failsafe module 300 that works according to a similar principle to failsafe module 200, but utilises a different latch mechanism, such that input member is coupled to the output member directly via the latch mechanism and not via the intermediate member. In contrast, FIG. 5-10 show the input member being coupled to the output member via the intermediate member and the latch mechanism, since part of the latch mechanism is attached to the intermediate member. Parts of the failsafe module 300 that provide a equivalent function to parts of failsafe modules 100 and 200 have the same reference numerals as those parts of failsafe modules 100 and 200, but are prefixed with the number "3", rather than the number "1" or "2".

The failsafe module 300 comprises an input member 310, an output member 312, and a coupling mechanism that can selectively couple the input member 310 to the output member 312. The input member 310 and the output member 312 both comprise surfaces extending parallel to a common axis, and which are co-axial about the common axis. The input member 310 has a smaller diameter than the output member 312 and is nested within the output member 312.

The output member 312 further comprises a base 312a at an axial end that extends perpendicular to the common axis. The input member 310 and the output member 312 are rotatable relative to each other about the common axis.

The axial surface of the input member 310 comprises a circumferential lower edge defining three helical input segments or edges 311a, 311b, 311c that extend helically about the common axis. The axial surface of the output member 312 defines three linear axial output edges 313a, 313b, 313c that extend parallel to the common axis.

The helical input edges 311a, 311b, 311c are left-handed helices that extend partially around the lower edge of the axial surface of input member 310, and are spaced regularly and continuously around the common axis. The axial output edges 313a, 313b, 313c are also spaced regularly on the axial surface of the output member 312 about the common axis. The input and output edges extend radially all the way through their respective axial surfaces. The input edges 311a, 311b, 311c and the output edges 313a, 313b, 313c are arranged in pairs such that within each pair, an input edge overlaps an output edge in the radial direction when the input member 310 and the output member 312 are nested. The length of the input edges 311a, 311b, 311c in the axial direction and the length of the output edges 313a, 313b, 313c in the axial direction are substantially the same so that one end of the input and output edges overlap at a particular relative angular position of the input and output members and the other end of the input and output edges overlap at a different relative angular position of the input and output members. The input and output edges are further arranged such that during rotation of the input member 310 relative to the output member 312, an overlap is maintained between corresponding input and output edges along the length of the edges.

The failsafe module 300 further comprises a coupling mechanism comprising an energy storage device 314 and an intermediate member 316 nested radially within the input member 310 and output member 312. The coupling mechanism also comprises a latch mechanism 318, 320 located outwith the nested input member 310 and output member 312, and specifically the latch mechanism is located in an axially upper portion of the failsafe module 300, as will be explained in more detail below.

Similar to FIGS. 5-10, the energy storage device 314 is in the form of a linear compression spring 314 arranged on the base 312a of the output member 312 and is co-axial with the input member 310 and the output member 312. As before, the spring 314 is configured to apply a force in the axial direction.

Figure 12:
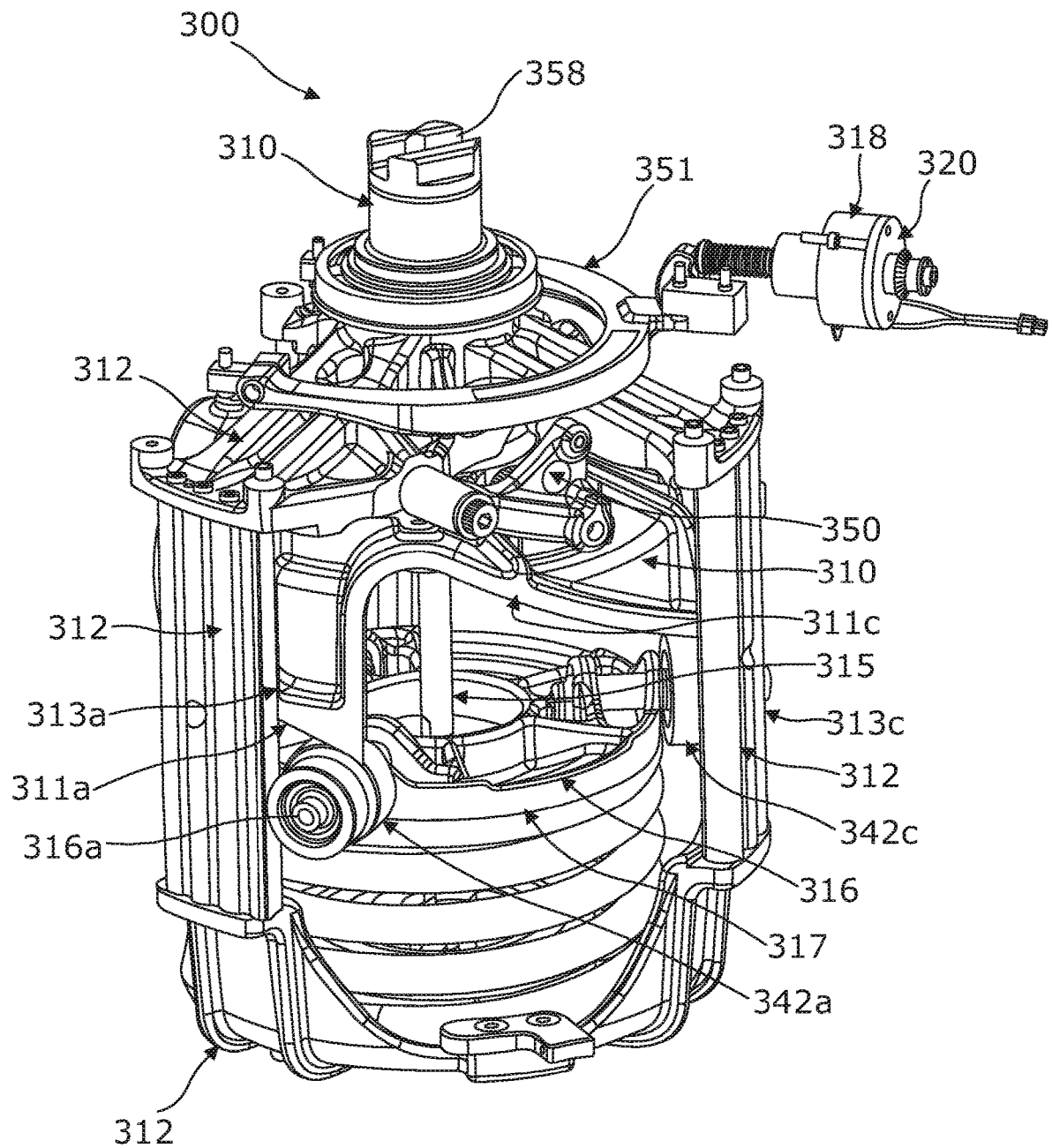
FIG. 12 shows a perspective view of the failsafe module of FIG. 11.

As best seen in FIG. 12, the intermediate member 316 sits above the spring 314 at the axial end of the spring 314 furthest from the base 312a of the output member 212, and is mounted on a shaft 315 co-axially with the input member 310 and output member 312. The shaft 315 allows the intermediate member 316 to both rotate about the common axis and move axially along the common axis due to rotation and axial movement of the shaft 315 itself relative to the output member 312.

The intermediate member 316 comprises a central portion and three radially extending arms 316a, 316b, 316c that are spaced regularly about the common axis. The arms 316a, 316b, 316c extend radially outward past the coils of the spring 314. Thus, the spring 314 is located between the output member 312 and the intermediate member 316, in particular between the base 312a and the arms 316a, 316b, 316c. As before, linear movement in the axial direction of the intermediate member 316 relative to the output member 312 against the spring 314 will cause the arms 316a, 316b, 316c to push against the coils of the spring 314, causing the spring 314 to compress and become energised. Conversely, expansion of the spring 314 will cause the coils of the spring 314 to push against the arms 316a, 316b, 316c of the intermediate member 316, which will urge the intermediate member 316 to move in the axial direction.

The input member 310, output member 312 and intermediate member 316 are configured such that each arm 316a, 316b, 316c extends in a radial direction across a pair of overlapping input edges 311a, 311b, 311c and output edges 313a, 313b, 313c. The input edges and output edges will therefore constrain the rotational and axial movement of the arms and the intermediate member 316. At the tip of each arm 316a, 316b, 316c are bearings 342a, 342b, 342c that allow each arm to travel along its respective input edge and output edge with low friction.

Figure 15:
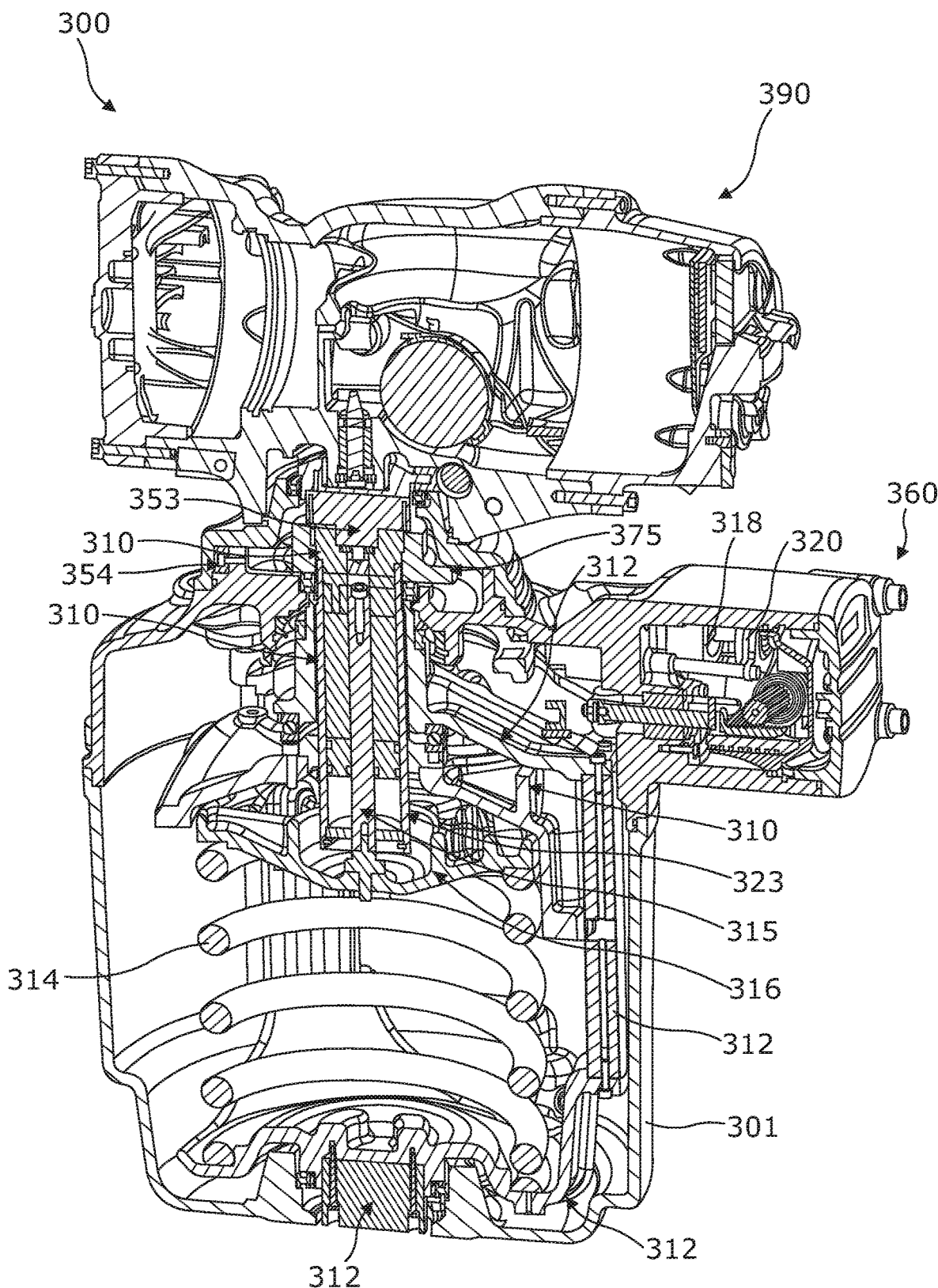
FIG. 15 shows a section view of the failsafe module of FIG. 11 connected to an actuator.

The latch mechanism comprises a first latch member in the form of an electromagnet 318 and a second latch member in the form of a ferromagnetic plate 320. Both the electromagnet 318 and the ferromagnetic plate 320 are located in an upper portion of the failsafe module 300, and spaced apart from the common axis. In particular, FIG. 15 shows the electromagnet 318 and the ferromagnetic plate 320 located within a separate module 360 attached to outer housing 301. The latch mechanism further comprises a clutch assembly coupled to the electromagnet 318 and the ferromagnetic plate 320.

The clutch assembly comprises an engagement member 362 mounted to an upper radial surface of the input member 310, and configured to rotate together with the input member 310. The engagement member 362 has the form of a profiled block comprising a groove 363 along an upper surface, that is the surface axially furthest from the base 312a. The clutch assembly also comprises a clutch 350 pivotally mounted to the output member 312, and a flat horseshoe shaped latch track 351 which can pivot relative to the input member 310 and the output member 312.

Figure 14:
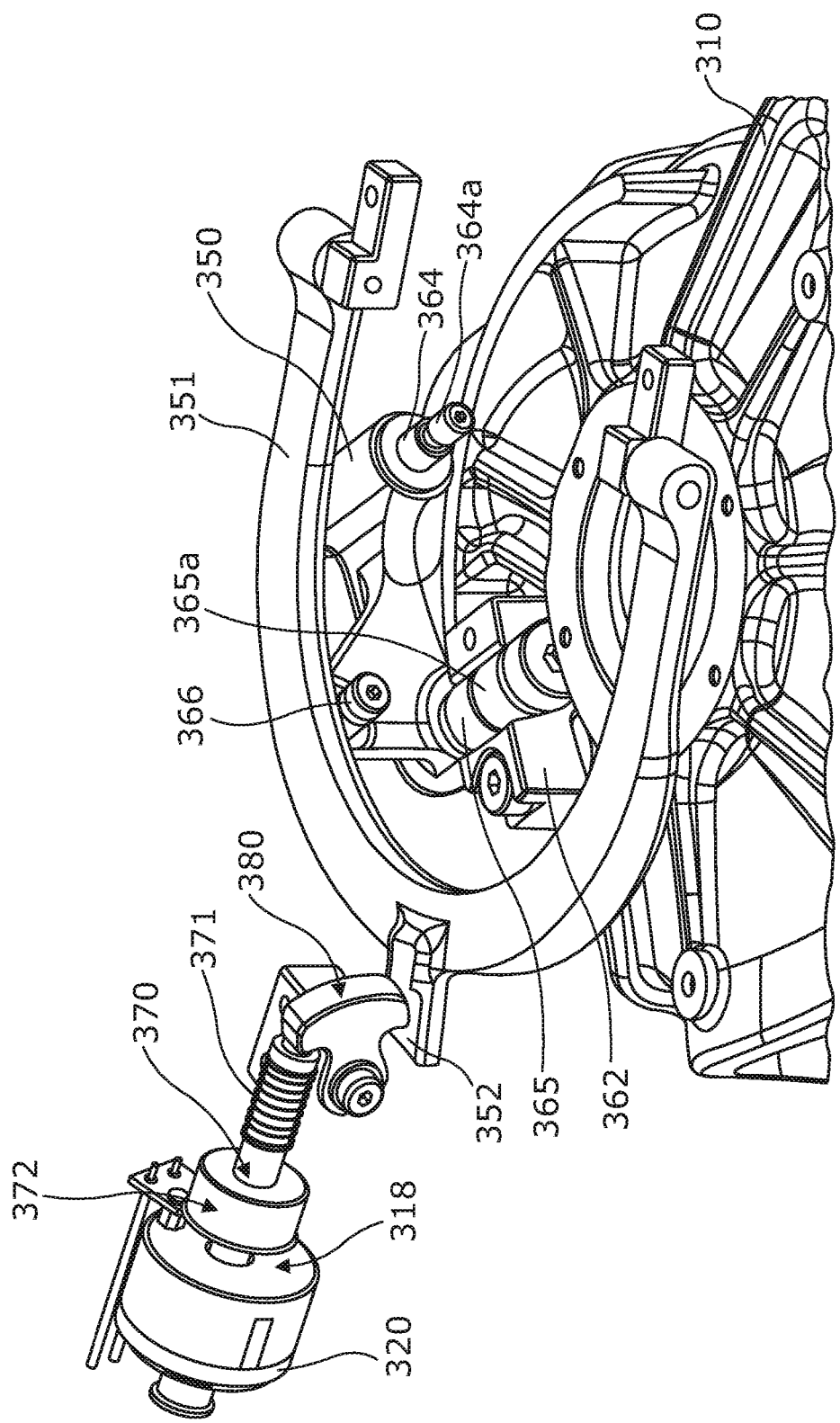
FIG. 14 shows a perspective view of a top portion of the failsafe module of FIG. 11.

The clutch 350 comprises three pins arranged in a triangular configuration (as seen in FIG. 14): an output pin 364 which pivotally mounts the clutch 350 to the output member 312; an input pin 365 which is configured to engage with the groove 363 to couple the input member 310 to the output member 312; and a track pin 366 against which track 351 acts to maintain engagement between the input pin 365 and the groove 363, as will be described in detail below.

Around the output pin 364 are bearings 364a which allow the clutch 350 to pivot with low friction, yet still be able to transmit a large force.

The clutch assembly also comprises a control rod 370 and a latch rocker 380. A spring 371 is located around control rod 370 between the electromagnet 318 and the latch rocker 380, specifically between a flame bush 372 located adjacent to the electromagnet 318 and the latch rocker 380.

The control rod 370 is attached to the ferromagnetic plate 320 and extends through the electromagnet 318. The control rod 370 is moveable between a retracted position whereby the ferromagnetic plate 320 and the electromagnet 318 are spaced apart; and an extended position whereby the ferromagnetic plate 320 is moved into contact with the electromagnet 318.

The latch rocker 380 is arranged between the control rod 370 and the latch track 351, and is configured to pivot between a first position whereby the control rod 370 is held in the retracted position, and the spring 371 is compressed between the flame bush 372 and the latch rocker 380; and a second position whereby the control rod 370 can move to the extended position due to extension of the spring 371, thus moving ferromagnetic plate 320 into contact with the electromagnet 318.

As will be described further below, the clutch assembly is arranged such that the magnetic force causing the electromagnet 318 and ferromagnetic plate 320 to couple is transferred to the clutch 350 via the control rod 370, latch rocker 380 and latch track 351, thereby holding the input pin 365 within groove 363, which in turn couples the input member 310 to the output member 312, and holds spring 314 in an energised state.

Operation of the failsafe module 300 will now be described.

As shown in FIG. 15, the input member 310 of the failsafe module 300 can be coupled to an actuator 390 to drive the input member 310. The output member 312 can be coupled to a valve for being actuated by the output member 312. The valve will have an operating position (e.g. open or closed) in which it is considered "safe" in an emergency situation. The valve may be actuated by the output member 312 toward and away from this "safe" position.

In use, the failsafe module 300 can undergo the same three main operations as failsafe modules 100 and 200—a charging operation, a normal operation and a safety operation. These operations will now be described in turn, in the context of the input member 310 being coupled to an actuator 390 and a valve being coupled to the output member 312.

Figure 13:
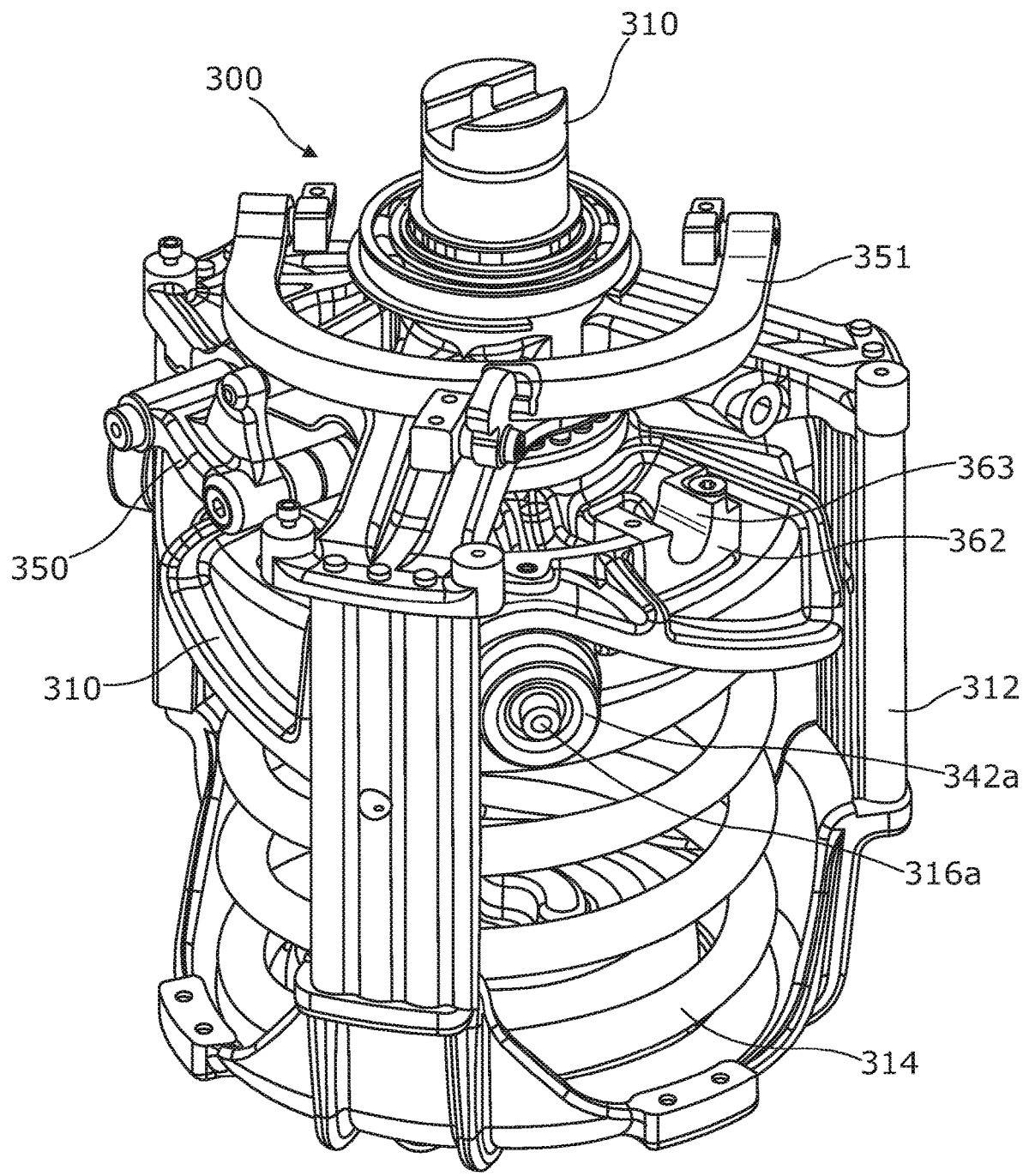
FIG. 13 shows a perspective view of the failsafe module of FIG. 11.

The charging operation is used to energise the spring 314. At the beginning of the charging operation, the valve is at a hard stop safe position, the output member 312 is at a predetermined angular position corresponding to the safe position of the valve, the spring 314 is not energised (or it may have a certain preload) and the latch mechanism is not engaged (i.e. the electromagnet 318 and the ferromagnetic plate 320 are not magnetically coupled). The input pin 365 of the clutch 350 is circumferentially offset from the groove 363, as shown in FIG. 13. Furthermore, the intermediate member 316 is at a first axial end of the housing 301, and the arms 316a, 316b, 316c are positioned at first ends of their respective input edges 311a, 311b, 311c and first ends of their respective output edges 313a, 313b, 311c.

Figure 11:
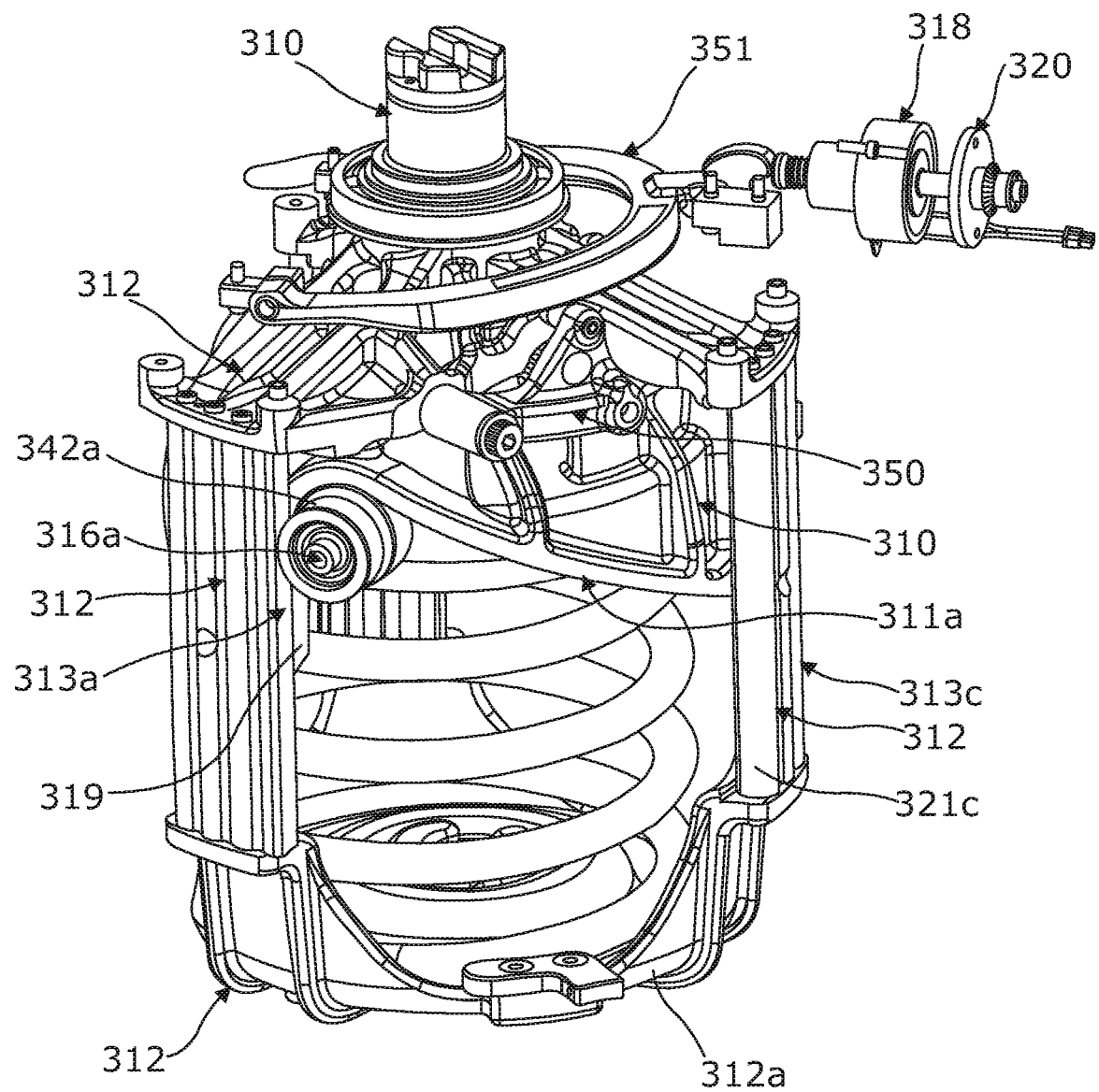
FIG. 11 shows a perspective view of another failsafe module.

The electromagnet 318 is then activated and the input member 310 is rotated in the same direction as the direction that the output member 312 would need to rotate to move the valve to the safe position. In the view of FIG. 11, this direction is the clockwise direction.

However, because the valve is at a hard stop in the safe position, the output member 312 is prevented from rotating in the clockwise direction and therefore the input member 310 rotates relative to the output member 312.

As the input member 310 rotates, a torque in the clockwise direction is applied by the axial surface defining the helical input edges 311a, 311b, 311c to respective arms 316a, 316b, 316c. However, because the output member 312 cannot rotate any further clockwise, the arms 316a, 316b, 316c are constrained from rotating in the clockwise direction by the axial surface defining the axial output edges 313a, 313b, 313c. Therefore, the torque being applied to the arms 316a, 316b, 316c can only be resolved by the arms traversing down the axial output edges 313a, 313b, 313c toward the base 312a. This movement of the arms is allowed by the helical input edges 311a, 311b, 311c because helices naturally have axial direction component. Furthermore, the helical input slots are left-handed helices and therefore the arms can move "down" when the input member is rotated clockwise. This axial movement of the arms 316a, 316b, 316c (and hence the intermediate member 316) toward the base 312a causes the spring 314 to become compressed between the arms 316a, 316b, 316c and the base 312a, which results in the spring 314 becoming energised.

As the input member 310 continues to rotate relative to the output member 312, the intermediate member 316 continues to move axially toward the base 312a and against the spring 314 until the intermediate member 316 reaches a coupling position in which the arms 316a, 316b, 316c have reached a second end of their respective input and/or output edges.

Furthermore, as input member 310 rotates relative to output member 312, the profiled block 362 comprising the groove 363 is moved closer to the input pin 365 of clutch 350.

Once the intermediate member 316 is in the coupling position, the input pin 365 of clutch 350 and the groove 363 are in circumferential alignment, and the input pin 365 is forced into engagement with the groove 363, as will now be described. The force exerted by the compressed spring 371 pulls the ferromagnetic plate 320 towards the electromagnet 318, thereby moving control rod 370 into the extended position, and thereby pivoting latch rocker 380 into the second position. As the latch rocker 380 pivots into the second position, it generates a force on a tag 352 attached to the latch track 351, thereby pushing the tag 352 downwards, and thereby pushing latch track 351 downwards. The downwards motion of latch track 351 generates a force on the track pin 366, thereby pushing clutch 350 downwards and causing it to pivot downwards around output pin 364, and forcing the input pin 365 into groove 363.

Spring 371 is selected to have enough force to move the ferromagnetic plate 320, the latch track 351, and clutch 350 simultaneously. In embodiments where the failsafe module 300 is inverted, spring 371 still generates enough force to move the ferromagnetic plate 320, the latch track 351, and clutch 350 simultaneously against gravity.

The electromagnet 318 and the ferromagnetic plate 320 are now magnetically coupled to each other. Whilst the electromagnet 318 and the ferromagnetic plate 320 are magnetically coupled to each other, the latch rocker 38 is held in the second position by the control rod 370, which thereby holds the latch track 351 against the latch pin 366, and thereby holds the input pin 365 in engagement with groove 363. The latch mechanism is now fully engaged.

Around the input pin 365 are bearings 365a which decrease the friction between the input pin 365 and the groove 363. Furthermore, the groove 363 is designed such that the side of the groove 363 closest to the output pin 364 is substantially vertical, and the side of the groove 363 furthest from the output pin 364 is sloping, such that the two sides of the groove 363 are substantially divergent. The profile of the groove 363 means that the axially upwards force of the spring 314 is constantly trying to disengage the input pin from the groove 363 by rolling the bearings 365a up the sloped side of the groove 363.

However, the strength of the magnetic coupling, and the resulting force transferred to the clutch 350 as described above, is greater than the force being applied by the spring 314 between the intermediate member 316 and the output member 312 such that the intermediate member 316 cannot move axially relative to the output member 312 and therefore the spring 314 is held in its energised state. The failsafe module 300 is now considered "charged" and can undergo normal operation. The charged failsafe module 300 is demonstrated in FIG. 12.

During normal operation, the input member 310, output member 312 and intermediate member 316 are rotationally fixed due to the action of the latch mechanism. When the latch mechanism is engaged and the input member 310 subsequently rotates in either direction, the output member 312 will rotate with the input member 310. As such, the position of the helical edges 311a, 311b, 311c, and the axial edges 313a, 313b, 313c, are in a fixed orientation with respect to each other, thereby preventing any axial movement of the intermediate member 316.

When rotating in the anti-clockwise direction, the force being applied to the arms 316a, 316b, 316c by the axial edges of the output member 312 will result in the arms being pushed by the axial surface defining the axial output edges 313a, 313b, 313c, which causes the arms to rotate in an anti-clockwise direction about the common axis with the input member 310 and the output member 312.

When in the charged position, the distance between the part of each helical edge 311a, 311b, 311c closest to the intermediate member 316 and a base 317 of the intermediate member 316 is less than the diameter of the bearings 342a, 342b, 342c surrounding each arm 316a, 316b, 316c. As such, each arm 316a, 316b, 316c is constrained between the axial surfaces defining the helical input edges 311a, 311b, 311c and axial output edges 313a, 313b, 313c when the spring 314 is energised.

Therefore, when rotating in the clockwise direction the force being applied to the arms 316a, 316b, 316c by the helical edges of the input member 310 will result in the arms being pushed by the axial surface defining the helical input edges 311a, 311b, 311c, which causes the arms to rotate in a clockwise direction about the common axis with the input member 310 and the output member 312.

During normal operation, work on the input member 310 is therefore directly transferred to the output member 312 such that rotation of the input member 310 causes corresponding rotation of the output member 312. The valve can therefore be actuated between its operating positions by actuating the input member 310.

During normal operation, an emergency situation may occur wherein, for example, power to the electromagnet 318 is lost; an emergency shutdown signal may be sent to the electromagnet 318 to turn it off; or a standing emergency shutdown signal to the electromagnet 318 is removed, causing it to turn off.

In this situation, a safety operation occurs in which the latch mechanism is released so that the intermediate member 316 is no longer axially fixed relative to the output member 312 and the spring 314 is free to release its stored energy. This results in a linear force being applied between the intermediate member 316 and the output member 312 in the axial direction that acts to drive the intermediate member 316 back to its starting axial position from the start of the charging operation. This movement of the intermediate member 316 rotationally drives the input member 310 relative to the output member 312 back to their starting angular positions from the start of the charging operation, as explained below.

Rotational movement of the input member 310 back to its starting position will be limited by an internal hard stop or a hard stop of the actuator (e.g. in the case of a non-backdrivable actuator). In any case, the spring 314 can store enough energy to provide an output force over the full movement of the output member 312 in addition to any movement of the input member 310.

When power is cut to electromagnet 318, the electromagnet 318 and the ferromagnetic plate 320 are magnetically decoupled. As such, the force transferred to the clutch 350 via the control rod 370, latch rocker 380 and latch track 351 is removed, or at least reduced to less than the force applied by the spring 314 between the intermediate member 316 and the output member 312.

The force applied by the spring 314 on the clutch 350 causes the clutch 350 to pivot around the output pin 364, and causes the input pin 365 to disengage with groove 363. The pivoting motion of the clutch 350 also causes latch pin 366 to rotate upwards, and thereby force latch track 351 axially upwards.

Movement of the latch track 351 axially upwards, causes tag 352 to exert a force on the latch rocker 380, thus pivoting the latch rocker 380 to the first position.

Since the electromagnet 318 is no longer powered, movement of the latch rocker 380 to the first position pushes the control rod 370 to the retracted position, whereby the ferromagnetic plate 320 is moved apart from the electromagnet 318, and the spring 371 is (re-)compressed between the latch rocker 380 and the flame bush 372.

Thus, upon release of the latch mechanism, and with the input member 310 being at or reaching a hard stop, the arms 316a, 316b, 316c are forced to traverse up the helical input edges 311a, 311b, 311c, causing the intermediate member 316 to rotate clockwise relative to the input member 310. The rotation of the intermediate member 316 and the arms 316a, 316b, 316c applies a torque to the axial surface defining the output edges 313a, 313b, 313c causing the output member 312 to rotate clockwise with the intermediate member 316, which drives the valve to move toward its safe position.

As shown in FIG. 15, the failsafe module 300 further comprises an optional compression damper 323 coupled between the shaft 315 and the input member 310 for regulating the rate of rotation of the output member 312. The damper 323 receives shaft 315 which can move axially relative to the damper 323. The damper 323 uses conventional fluidic, magnetic or frictional means to limit the axial velocity of shaft 315. By regulating the axial velocity of shaft 315, the rotational velocity of the arms 316a, 316b, 316c of the intermediate member 316 along the helical input edges 311a, 311b, 311c of the input member 310 is regulated, which in turn regulates the rotational velocity of the output member 312 during the safety operation.

The strength of the springs 214 and 314 may be chosen based on the torque required to operate the valve during the safety operation.

After a safety operation has taken place, the failsafe modules 200 and 300 may be recharged by performing the charging operation again.

Various sensors may be provided to indicate, for example, when the ferromagnetic plate 220, 320 has coupled to the electromagnet 218, 318; the force required to move the intermediate member 216, 316 to the coupling position, and the reaction force of the intermediate member 216, 316 when held in the charged position. Wired or wireless communication features can be provided to relay signals from the sensors to a controller.

In a variation of failsafe modules 200 and 300, the angle between the helical input slots or edges and a plane perpendicular to the common axis (hereafter referred to as the "angle" of the helical input slots/edges) varies along the length of each slot/edge. For example, the angle of the helical input slots/edges may decrease from the first end of the input slots/edges to the second end of the input slots/edges (i.e. in the charging direction toward the base 212a, 312a). This variation in the angle of the helical input slots/edges can be used to compensate for an increasing spring force as the spring 214, 314 becomes more and more compressed, and similarly compensate for a drop-off in spring force as the spring 214, 314 expands (as described by Hooke's law). In particular, the angle of the helical input slots/edges can be decreased in the charging direction such that the input torque required to rotate the input member 210, 310 to charge (compress) the spring 214, 314 can be made approximately constant over substantially the whole charging operation, and the torque output by the spring 214, 314 (via the intermediate member 216, 316) can be made approximately constant over substantially the whole safety operation. Other variations in the angle of the helical input slots/edges may be used to provide a desired torque input and/or output.

Various modifications of failsafe modules 200 and 300 will be apparent to those skilled in the art. For example, instead of the input member 210, 310 being nested in the output member 212, 312, the output member 212, 312 may be nested in the input member 210, 310.

The spring 214, 314 is not limited to being co-axial with the input member 210, 310 and output member 212, 312, as long as it is arranged to apply a linear force in the axial direction between the intermediate member 216, 316 and the output member 212, 312. Instead of a compression spring, an extension spring could be used instead, whereby the intermediate member moves axially away from the base of the output member during the charging operation to pull on an end of the extension spring and energise it.

Although the failsafe modules 200 and 300 have been described as having three input slots/edges with a corresponding number of output slots/edges and arms, other numbers of input slots/edges may be used instead, e.g. one, two, three, four or five input slots/edges arranged circumferentially on the cylindrical tubular wall or axial surfaces of the input member, with a corresponding number of output slots/edges and arms. The clockwise and anti-clockwise functions of the input member may be reversed by reversing the hand of the helical input slots.

The position of the electromagnet 218, 318 and the ferromagnetic plate 220, 320 may be switched. The ferromagnetic plate 220, 320 is not limited to being in the form of a plate and could have another shape, as long as the electromagnet 218, 318 and the ferromagnetic plate 220, 320 are arranged such that they can magnetically couple to each other when the intermediate member 216, 316 is moved axially toward the output member 212, 312.

Failsafe module 100 and the failsafe modules 200 and 300 work on the same principle of using relative movement between the intermediate member and the output member to energise an energy storage device acting between them, and providing a latch mechanism to selectively prevent relative movement between the intermediate member and the output member. When the latch mechanism is engaged, the input member is coupled to the output member and the energy storage device is held in an energised state. In this way, once the energy storage device is energised and the latch mechanism is engaged, the energy storage device is isolated from the coupling between the input member and the output member.

Therefore, a valve or other device coupled to the output member can be actuated between its operating positions by actuating the input member with no work being done against or by the energy storage device. This means that an actuator coupled to the input member only needs to be sized for the greater of the torque needed to energise the energy storage device or the torque needed to operate the valve, rather than the sum of these torques. Where the actuator can be programmed, a different torque protection level can be applied during the charging operation and during normal operation to give optimum protection to the failsafe module and the valve.

It may be necessary to remove the actuator 390 from the failsafe module 100, 200, 300 in the field for servicing. Removing the actuator 390 from the failsafe module 100, 200, 300 can pose various safety risks to the operator, depending on if the spring is energised, and if the latch mechanism is engaged.

If the spring is not energised (either because the spring was not energised, or it had de-energised due to an emergency situation) and the latch mechanism is not engaged, then the risk that an operator will be injured during removal of the actuator is low.

If the spring is energised and the latch mechanism is engaged, thereby coupling the input member and the output member, torque is only applied to the input member by the actuator when the valve needs to be moved. Whilst the valve is stationary (either in the safe position, the unsafe position or at any midpoint), no torque is being applied to the input member by the actuator. In this scenario, the risk that an operator will be injured during removal of the actuator is low. If power to the electromagnet 318 is removed after the actuator has been removed from the failsafe module, the spring 314 will de-energise, thereby causing rotation of the input member 310 through a quarter turn in one second, which is not considered to be a safety hazard.

However, if during normal operation an emergency situation arises which causes the latch mechanism to disengage whilst the valve is located at a midpoint between the safe and unsafe positions, then the spring will only need to partially de-energise to move the valve to the safe position. In this scenario, the latch mechanism is disengaged and the output member 312 and valve have been moved to the hard stop safe position, but the spring 314 is still partially energised. The valve cannot be moved away from the safe position until the spring 314 has been fully re-energised, and the latch mechanism re-engaged. In this scenario, there is a high risk of injury to an operator if the actuator is removed from the failsafe module, as described below.

The partially de-energised spring 314 applies an axial force to the input member 310, thereby causing tension within the actuator 390. As the actuator 390 is removed from the failsafe module, the force applied to the input member 310 is suddenly released, and can only be resolved by rotating the input member 310 anti-clockwise because the output member 312 is at a hard stop in the safe position. The tension within the actuator 390 is also released, thereby causing the drive mechanism within the actuator to rotate clockwise. The reaction force created by the actuator rotating clockwise will cause the outer housing of the actuator 390 to rotate anti-clockwise. As such, when the spring is at least partially energised, and the latch member is disengaged, the axial force applied by the spring 314 is transferred to rotational movement of the actuator housing as it is removed from the failsafe module, which is a safety hazard and could cause injury to an operator.

To help mitigate this safety hazard, the failsafe module 100, 200, 300 may also comprise a safety mechanism which enables safe separation of the actuator 390 from the failsafe module 100, 200, 300. FIGS. 15-18 show the safety mechanism in combination with the embodiments shown in FIGS. 11-14, however it will be appreciated that the same safety mechanism can be used with either of the embodiments shown in FIGS. 1-4, or FIGS. 5-10.

As shown in FIGS. 15-18, the safety mechanism comprises a cover 354 comprising an circular upper surface 354a and a skirt 354b extending around the edge of the upper surface 354a. The cover 354 is attached to the actuator 390 via bolts 359 extending through the upper surface 354a and into the base of the actuator 390, and can be removably mounted to the outer housing 301 via bolts 356 extending through feet 355 located at the base of the skirt 354b. When the cover 354 is mounted to the outer housing 301, the cover 354 and the outer housing 301 are co-axial about the common axis. The cover 354 rotationally fixes the outer housing of the actuator 390 and the outer housing 301 of the failsafe module.

Figure 16:
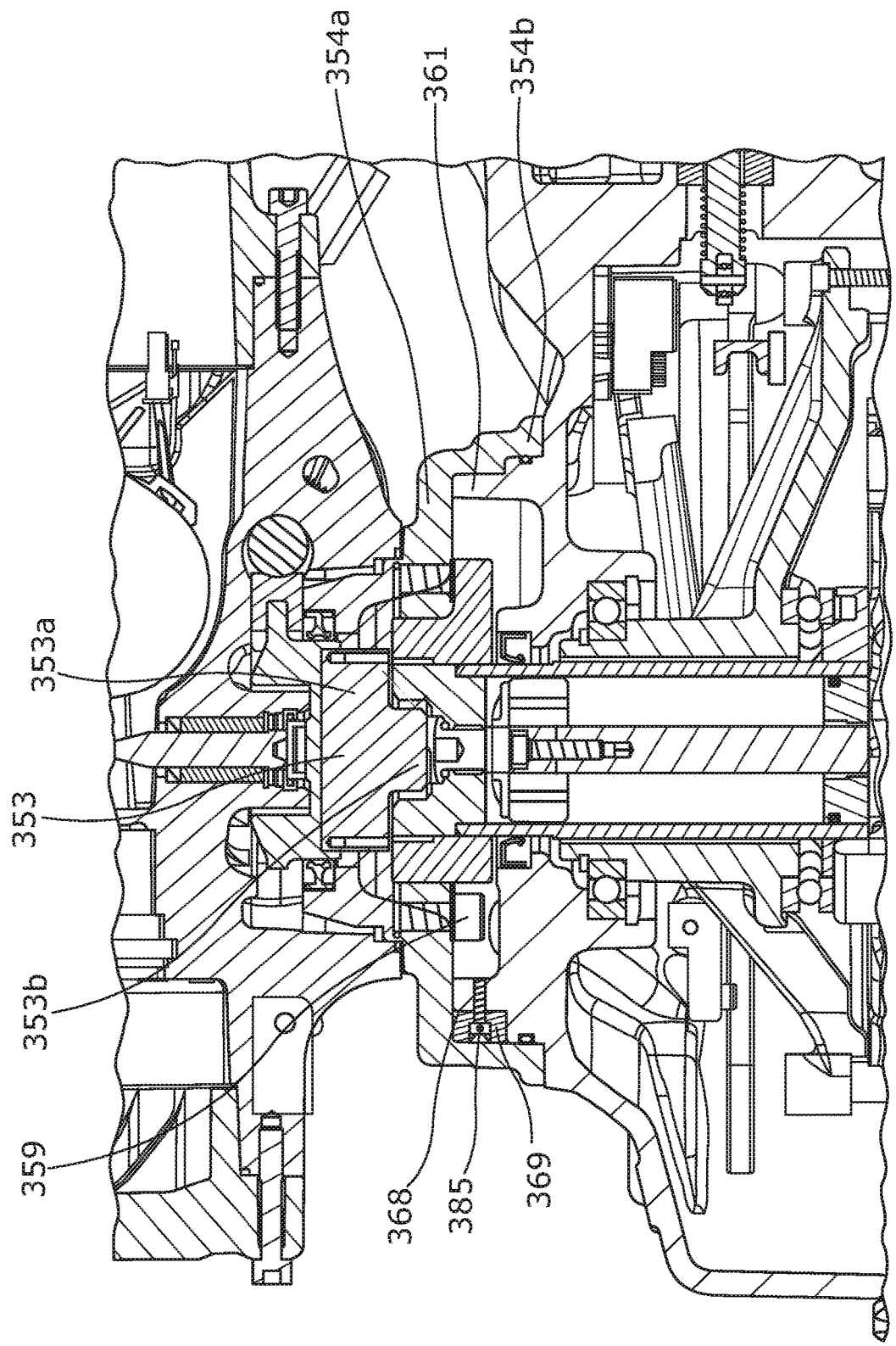
FIG. 16 shows a further section view of the failsafe module of FIG. 11.
Figure 17:
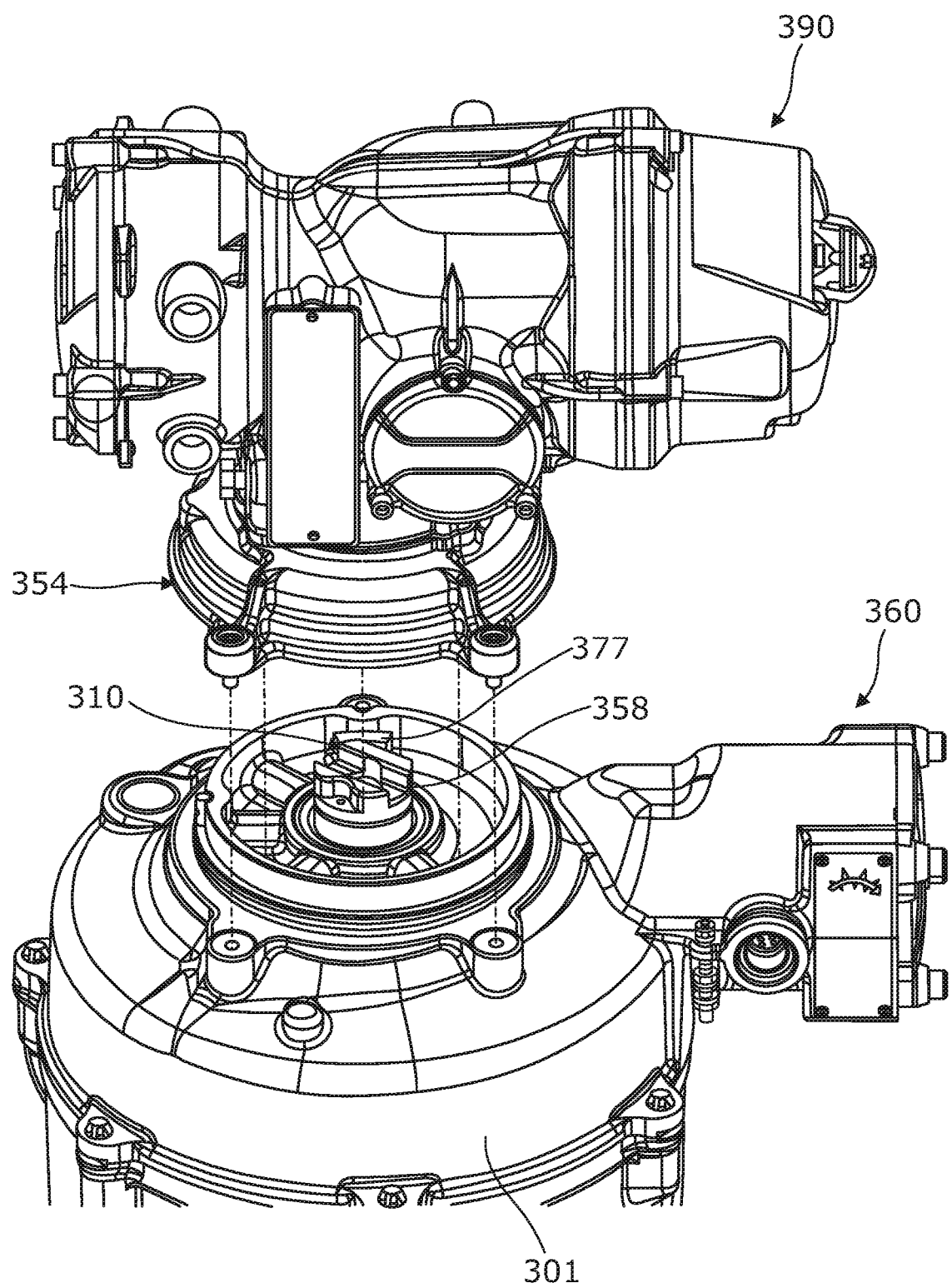
FIG. 17 shows an exploded view of the failsafe module of FIG. 15 as viewed from above.

The actuator 390 engages with the top of the input member 310 via a T-connector 353. The T-connector 353 comprises a radial leg 353a and an axial leg 353b, as seen in FIGS. 15 and 16. The top of the input member 310 comprises a notch or recess 358 configured to receive the axial leg 353b of the T-connector 353. When the actuator 390 is mounted to the failsafe module 300, the axial leg 353b of the T-connector 353 engages with notch 358, such that the T-connector 353 and the input member 310 are co-axial about the common axis. Driving the actuator 390 in a clockwise or anti-clockwise direction will therefore rotate the input member 310 in the same direction.

The outer housing 301 of the failsafe module 300 comprises a spigot 361 creating a circumferential wall around the top of the input member 310. The outer diameter of the spigot 361 is less than the inner diameter of the cover 354, such that when the cover 354 is mounted to the outer housing 301, it slots over the spigot 361.

Figure 18:
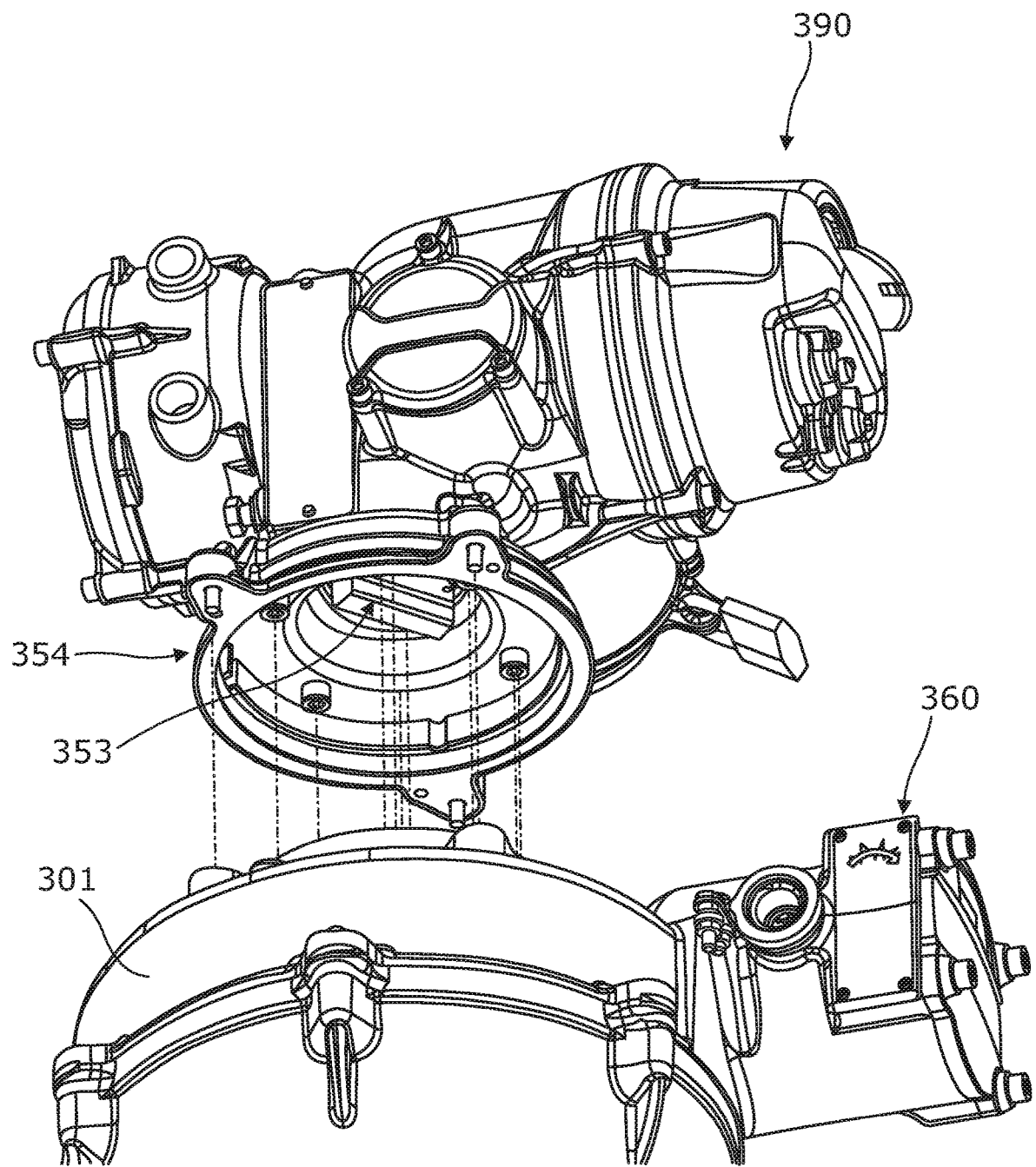
FIG. 18 shows an exploded view of the failsafe module of FIG. 15 as viewed from below.
Figure 19:
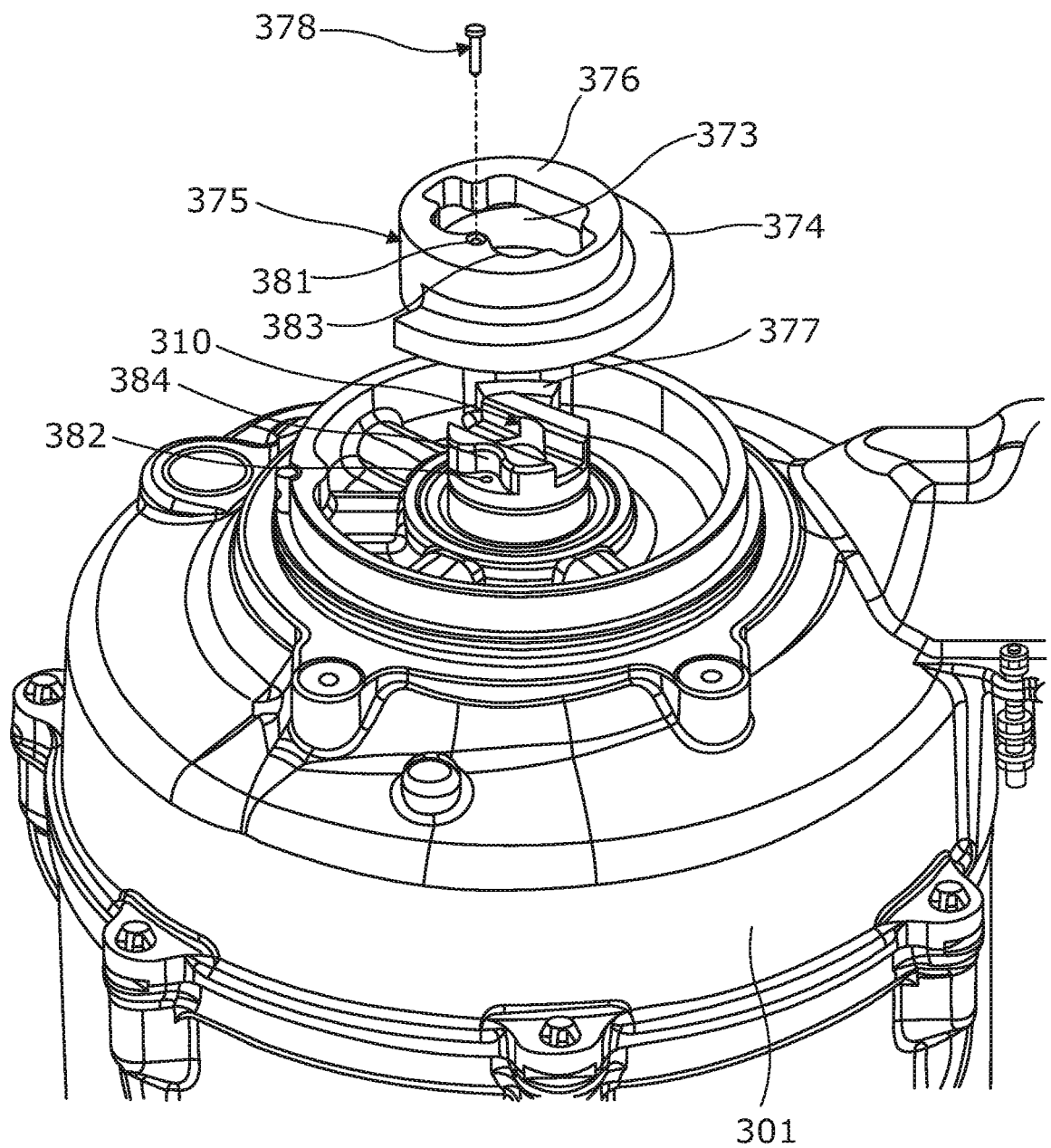
FIG. 19 shows a exploded view of a failsafe module as viewed from above.

At least two recesses 367 are spaced apart around the inner edge of the skirt 354b, as shown in FIG. 18. The spigot 361 comprises two axially extending grooves 368 which each accommodate a cylindrical peg 369 secured within the grooves 368 via radially extending screws 385. The pegs 369 are spaced apart around the circumference of the spigot 361. The location of the pegs 369 correspond to the location of the recesses 367, such that when the cover 354 is mounted to the outer housing 301, the pegs 369 interlock with the recesses 367, thereby preventing any relative rotation between the actuator 390, the cover 354 and the outer housing 301.

As best seen in FIG. 16, the internal axial length of the skirt 354b is greater than the length of the axial leg 353b of the T-connector 353. This ensures that the T-connector 353 is disengaged from the notch 358 before the cover 354 is separated from the spigot 361.

The operation of the safety mechanism will now be described below.

Before operation, the cover 354 is mounted to the actuator 390 via bolts 359 extending through the upper surface 354a and into the base of the actuator 390. The cover 354 is then mounted to the outer housing 301 of the failsafe module 300 by first aligning the recesses 367 around the inner surface of the skirt 354b with the pegs 369 around the spigot 361, and also aligning the axial leg 353b of the T-connector 353 with the notch 358 at the top of the input member 310. The cover 354 is then placed over the spigot 361, such that the axial leg 353b of the T-connector 353 interlocks with notch 358, and the pegs 369 slot into recesses 368. The cover 354 is then fixed to the outer housing 301 via bolts 356 extending through feet 355 at the base of the skirt 354b. The actuator 390 can then drive the input member 310 to charge the spring 314 and to move the valve between the safe and unsafe positions, as explained above.

To remove the actuator 390, first the bolts 356 through the feet 355 at the base of the skirt 354b are removed, to allow the cover 354 to be separated from the spigot 361.

In the scenario where the spring 314 is at least partially energised and the latch mechanism is disengaged, as the cover 354 is removed from the outer housing 301, the axial leg 353b of the T-connector 353 disengages from the notch 358 before the cover 354 is separated from the spigot 361. Once the axial leg 353b of the T-connector 353 is disengaged from the notch 358, the axial force applied by spring 314 will cause the input member 310 to rotate anti-clockwise. The output member 312 cannot move clockwise because it is already at a hard stop due to moving the valve to the safe position, as such the axial force applied by the spring 314 can only be resolved by anti-clockwise rotation of the input member 310.

The tension within the actuator 390 is simultaneously released, causing the drive mechanism of the actuator 390 to rotate clockwise. However, since the actuator 390 is fixed to the cover 354, and relative rotation between the cover 354 and the outer housing 301 is prevented due to the interlock between the pegs 369 and recesses 367, the reaction force created by the clockwise rotation of the drive mechanism cannot translate into anti-clockwise rotation of the actuator housing. As such, the actuator housing remains stationary throughout the process of removing the actuator 390 from the failsafe module 300, thereby ensuring the safety of the operator during servicing.

The safety function is defined herein as the ability to apply torque to the valve to thereby move the valve to the safe position. In the present invention, the safety function is provided by the failsafe module 100, 200, 300, whereby a spring 114, 214, 314 is held in an energised position, such that during an emergency situation the energy held in the spring 114, 214, 314 can be released to move the valve to the safe position. If the safety function is overridden, for example by a local hand powered lever or wheel, this means that the valve is moved towards the unsafe position without first charging the spring 114, 214, 314, and therefore there are no means available to automatically return the valve to the safe position in the case of an emergency situation, which is a safety hazard.

Some actuators are designed to prevent any override of the safety function, whereas other actuators are designed to always allow override of the safety function. Although removing the ability to override the safety function is often preferable, it can be beneficial to have temporary access to this functionality in the field. Failsafe modules 100, 200 and 300 may therefore comprise a collar 375 which can be configured to enable or disable the safety function override as required. As will be described in more detail below, the collar 375, when present, prevents the valve from being moved away from the safe position when the spring 114, 214, 314 is not energised, thereby ensuring that the safety function is available to move the valve back to the safe position in the case of an emergency.

The collar 375 will be described below in combination with the embodiments shown in FIGS. 11-14, however it will be appreciated that the same collar can be used with either of the embodiments shown in FIGS. 1-4, or FIGS. 5-10.

As shown in FIGS. 19-22, the collar 375 comprises an inner part 376 and an outer part 374 extending radially outwardly from the inner part 376, and extending substantially around the circumference of the inner part 376, such as more than two thirds of the way around. Each circumferential end 374a, 374b of the outer part 374 comprises a flat face.

The inner part 376 comprises an aperture 373 extending axially through the inner part 376. The aperture 373 is configured to fit around the top portion of the input member 310 comprising the notch 358. That is, the aperture 373 and the top portion of the input member 310 are correspondingly shaped. The aperture 373 comprises a lip 383 which interlocks with a corresponding indent 384 on the top portion of the input member 310 when the collar 375 is fitted to the input member 310.

The collar 375 is secured to the input member 310 via a lock nut 378 which extends through a first fixing hole 381 on the lip 383, and into a second fixing hole 382 located on the input member 310 at the base of indent 384. The first and second fixing holes 381, 382 are aligned when the collar 375 is fitted to the input member 310, thereby allowing the lock nut to extend through each of the first and second fixing holes 381, 382. As such, the input member 310 and the collar 375 are co-axial around the common axis, and rotationally fixed, when the collar 375 is secured to the input member 310.

The lock nut 378 comprises a uniquely shaped head 379, which is shown in FIG. 20A. The shape of the head 379 is configured such that the lock nut 378 can only be removed by a corresponding uniquely shaped key. As such, the collar 375 can only be secured to or removed from the input member 310 when the uniquely shaped key engages with the uniquely shaped head 379, to thereby tighten or release the lock nut 378. This requires the operator to be in possession of the uniquely shaped key.

A stop 377 is located adjacent to the inner surface of spigot 361, such that the stop 377 is located in the rotational path of the outer part 374 when the collar 375 is mounted to the input member 310.

Figure 22:
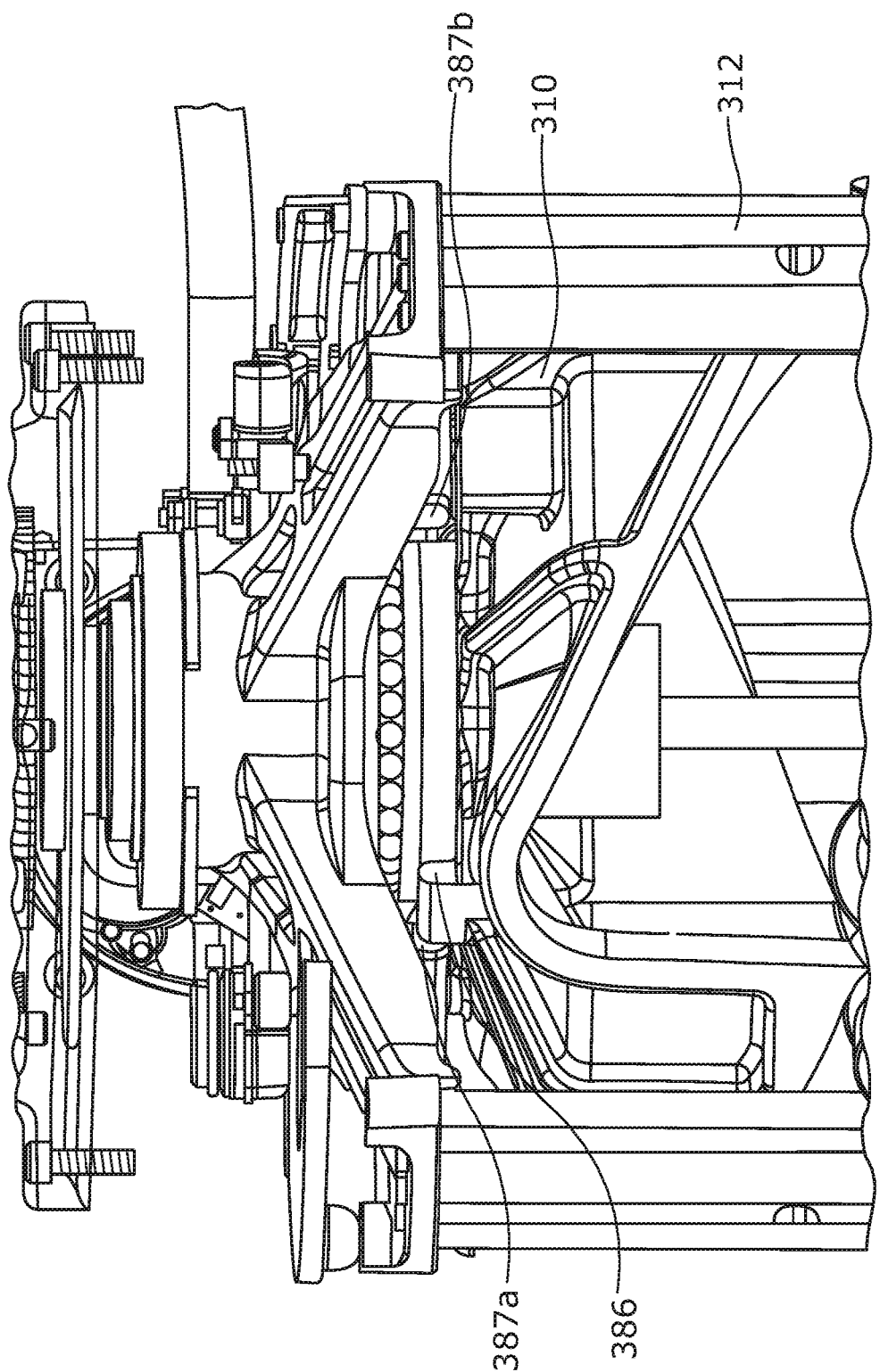
FIG. 22 shows a partial perspective view of the failsafe module of FIG. 11.

As shown in FIG. 22, the input member 310 comprises a tab 386, and the output member 312 comprises two tabs 387a, 387b. Tab 386 on the input member 310 is located between tabs 387a, 387b on the output member 312, such that rotation of the input member 310 relative to the output member 312 is limited by tabs 387a, 387b. The angle between the safe and unsafe positions of the valve is 90 degrees, with a tolerance of around 5 degrees in each direction. As such, the angular distance between tabs 387a, 387b is around 100 degrees.

Operation of the collar 375 to enable or disable the safety function override will now be explained.

As shown in FIG. 11, initially the output member 312 and valve are at a hard stop in the safe position. The actuator 390 is in an unsafe position, whereby the latch mechanism is not engaged to couple the input member 310 to the output member 312, and the spring 314 is not charged. Therefore the safety function is considered unavailable. In this position, tab 386 on the input member 310 is adjacent to and contacting tab 387b on the output member 312.

If the collar 375 is not present and the spring 314 is not energised, then it is possible for an operator to move the valve away from the hard stop safe position towards the hard stop unsafe position by moving the actuator into an override state, as will be described below.

Starting from the configuration shown in FIG. 11, the valve is in the safe position and the actuator is in the unsafe position, such that the valve and the actuator are 90 degrees apart. Driving the actuator 390 in an anti-clockwise direction will cause the input member 310 to rotate in the anti-clockwise direction. The intermediate member 316 is also rotated in an anti-clockwise direction via an axial surface 319 located between adjacent helical edge segments 311a, 311b, 311c of the input member 310. Axial surface 319 abuts the arms 316a, 316b, 316c of the intermediate member 316, and pushes the arms 316a, 316b, 316c in the anti-clockwise direction with the input member 310. Since the latch mechanism is not engaged, the torque applied to the input member 310 is transferred to the output member 312 via the interaction of tabs 386 on the input member 310 and 387b on the output member 312, thereby rotating the output member 312 in the anti-clockwise direction and moving the valve away from the unsafe position. The input member 310, intermediate member 316, and output member 312 are rotationally fixed via tabs 386 and 387b, and therefore rotate together in the anti-clockwise direction. The valve and actuator remain 90 degrees apart as the valve is moved towards the unsafe position, and the actuator is moved into the override state.

However, since the spring 314 has not been previously energised and the latch mechanism is not engaged, there is no safety function available to automatically return the valve to the safe position in the case of an emergency, which is a safety hazard. In this case, the actuator 390 may be configured to reset back to the unsafe position upon receipt of a remote signal (the configuration shown in FIG. 11).

The actuator reset causes the input member 310 to rotate in a clockwise direction. Since the output member 312 is not at a hard stop safe position (because the valve was manually moved away from this position), the frictional torque of the valve (and therefore output member 312) is less than the torque applied to the input member 310. The resulting force applied to the arms 316a, 316b, 316c can therefore be resolved by rotating the arms 316a, 316b, 316c clockwise. The clockwise rotation of the arms will push the output member 312 clockwise via axial surfaces 313a, 313b, 313c to move the output member 312 and the valve to the hard stop safe position. The input member 310, intermediate member 316, and output member 312 therefore rotate together in the clockwise direction. As such, the valve and actuator remain 90 degrees apart as the valve is moved back towards the safe position, and the actuator is moved back to the unsafe position.

The spring 314 is not energised during the reset process. The spring 314 can only be energised when the output member 312 and the valve are at the hard stop safe position, and the torque applied to the input member 310 by the actuator and the frictional torque of the valve are balanced. However, once the actuator has been reset back to the unsafe position, and valve has been reset back to the safe position, the actuator can keep rotating clockwise to initiate the charging process.

To disable the safety function override capability, an operator can remove the actuator (for example, in the manner described above), and fit collar 375 over the top of the input member 310. The operator can then use the unique key to tighten lock nut 378, and fix the collar 375 to the input member 310.

If the collar 375 is present and the spring 314 is not energised, then it is no longer possible for an operator to move the valve away from the hard stop safe position towards the hard stop unsafe position, as will be described below.

Figure 20:
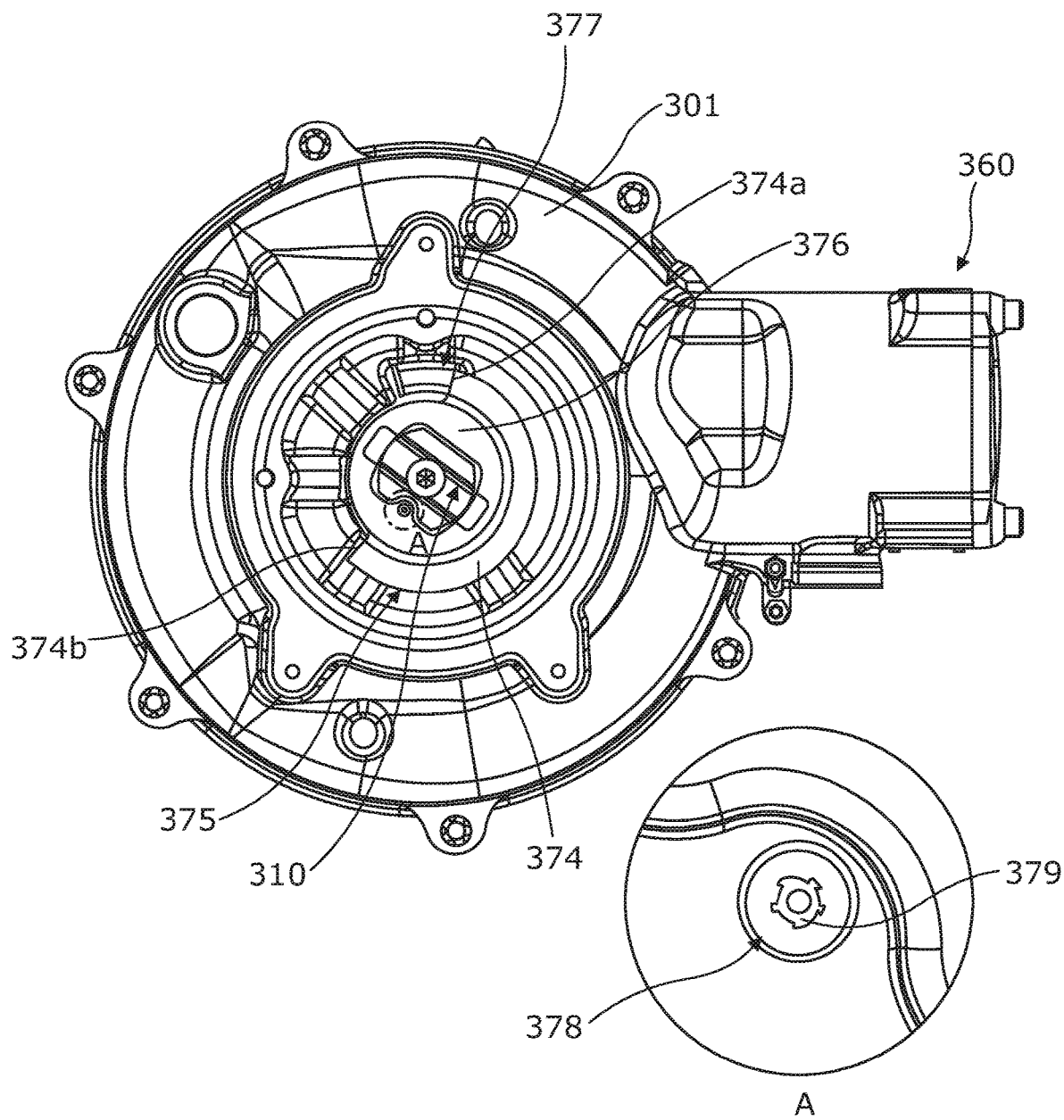
FIG. 20 shows a perspective view of the failsafe module of FIG. 19 as viewed from above.
Figure 21A:
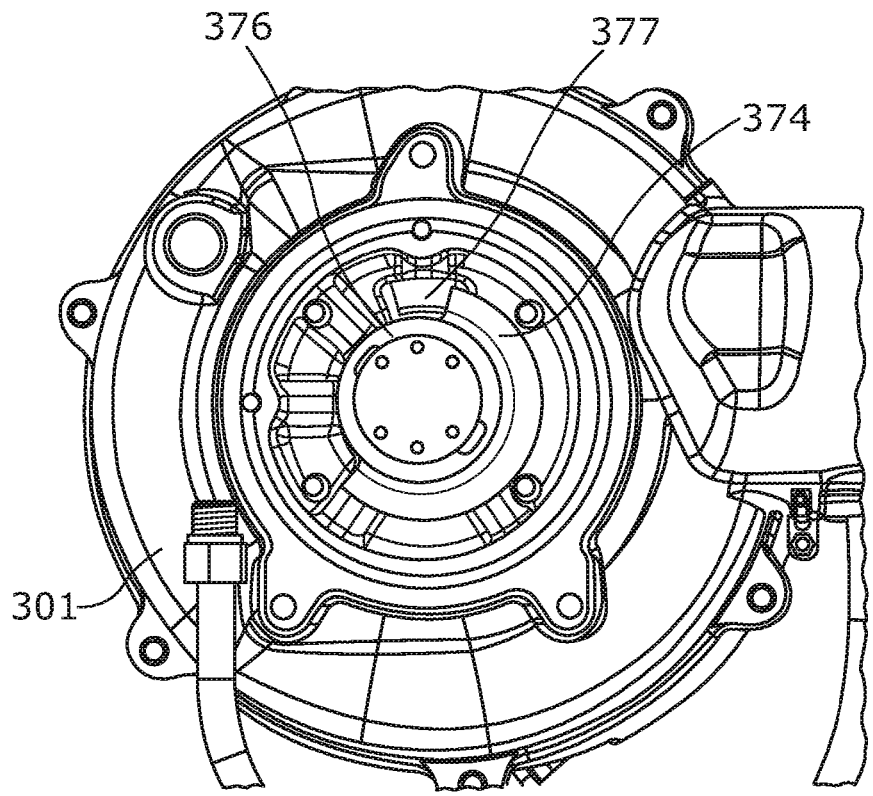
FIGS. 21A and 21B show a further perspective view of the failsafe module of FIG. 19 as viewed from above.
Figure 21B:
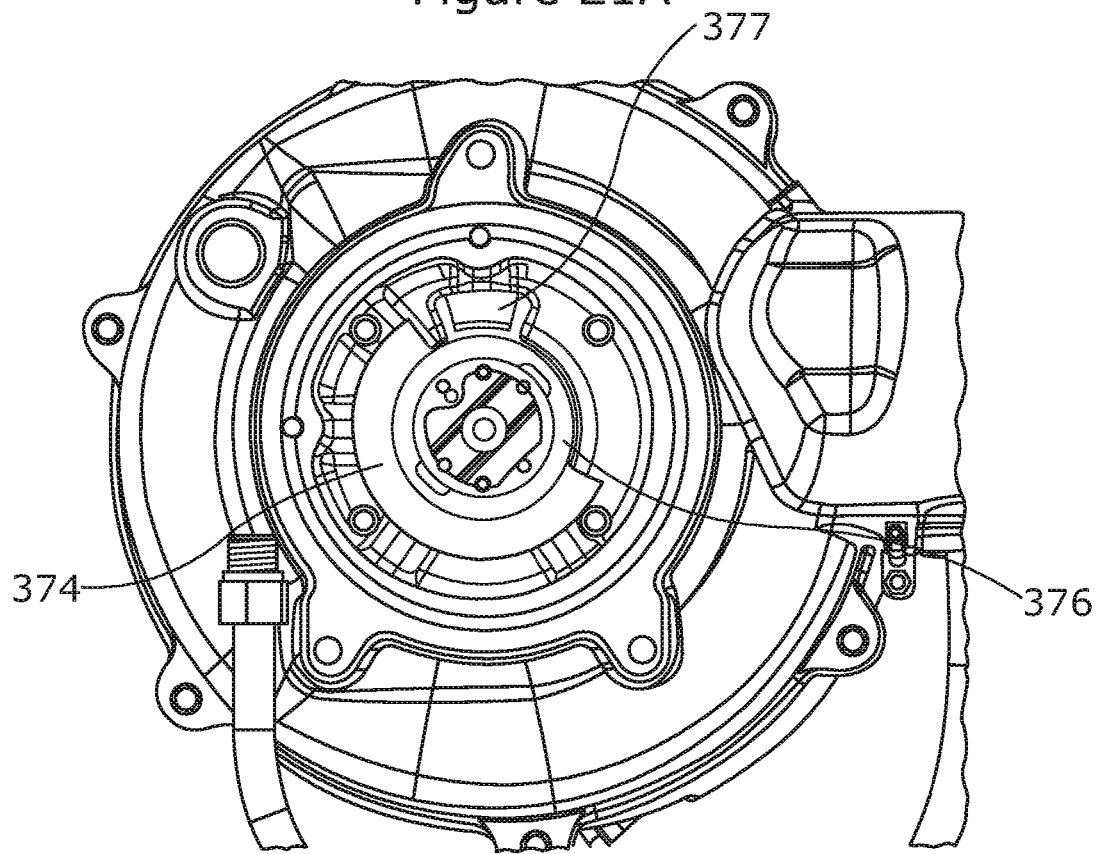

As shown in FIGS. 20, 21A and 21B, when the collar 375 is installed, circumferential edge 374a abuts stop 377, to thereby prevent the input member 310 from rotating anti-clockwise to open the valve. As such, the safety function override is not available.

However, the input member 310 can be rotated in the clockwise direction, thereby causing the spring to be energised (the configuration shown in FIG. 12). The process of charging up the spring 314 causes the valve to remain in the safe position, and causes the actuator to move to the safe position, such that the valve and the actuator are now 0 degrees apart.

Once the spring 314 is energised and the latch mechanism is engaged, the collar 374 will be in the position shown in FIG. 21B. The input member 310, intermediate member 316, and output member 312 can now be rotated together anti-clockwise to move the valve to the unsafe position. The valve can be moved to the unsafe position either automatically by the actuator, or manually via a handwheel or lever. Therefore, when the spring 314 is energised, the valve position can be overridden manually during normal operation, but the safety function cannot be overridden and remains available in the event of an emergency situation.

As shown in FIGS. 20, 21A, and 21B, the rotational path of the collar 375 is limited to a range of 120 degrees due to the shape of the outer part 374 and the position of the stop 377. This is greater than the range of rotation between the input member 310 and output member 312, which is limited to 100 degrees due to tabs 386, 387a and 387b, thereby ensuring that the stop 377 does not prevent the valve from returning to the safe position during an emergency situation.

As such, when the spring 314 is energised and the valve is in the unsafe position, edge 374a will contact the stop 377. However, when the valve is in the safe position, edge 374b does not contact the other face of stop 377, and is actually set apart from stop 377 by some angular distance, such as 10 degrees. This angular distance accommodates a large variety of tolerances, which can vary during manufacture of the collar 375 and other components within the failsafe module 100, 200, 300. If the operator is in possession of the uniquely shaped key, the collar 375 can be fitted or removed in the field, to enable or disable the safety override functionality as required. As such, the safety override functionality of failsafe module 100, 200, 300 can be configured one way or the other, through the presence or absence of the collar 375.

In a variation of failsafe modules 100, 200, 300, the safety function can be overridden by clockwise rotation of the actuator and input member, instead of anti-clockwise rotation as described above. As such, when the spring is energised and the valve is in the unsafe position, edge 374b will contact the stop 377. However, when the valve is in the safe position, edge 374a does not contact the other face of stop 377, and is set apart from stop 377 by some angular distance, to ensure the valve returns to the safe position during an emergency situation.

The invention claimed is:

1. A failsafe module comprising:
an input member;
an output member movable toward and away from a predetermined position;
a coupling mechanism for coupling the input member to the output member, the coupling mechanism comprising:
an intermediate member engaged with the input member and movable by the input member between a first position and a second position;
an energy storage device acting between the output member and the intermediate member, such that movement of the intermediate member relative to the output member from the first position to the second position energizes the energy storage device, and wherein the energy storage device, the output member, and the intermediate member are engaged such that a release of energy from the energy storage device drives the output member to the predetermined position; and
a latch mechanism having an engaged state in which the latch mechanism prevents relative movement between the intermediate member and the output member when the intermediate member is in the second position, to thereby hold the energy storage device in an energized state and to thereby couple the input member to the output member, and the latch mechanism having a released state in which the latch mechanism allows relative movement between the intermediate member and the output member, to thereby allow the energy storage device to be energized or to release energy;
wherein the latch mechanism comprises a first latch member and a second latch member, wherein the first latch member and the second latch member are configured to couple when the intermediate member is in the second position; and wherein the latch mechanism further comprises a clutch assembly configured to couple the input member to the output member when the latch mechanism is in the engaged state;
wherein the clutch assembly comprises a clutch mounted to the output member, and an engagement member mounted to an upper radial surface of the input member and circumferentially offset from the clutch when the intermediate member is in the first position; wherein movement of the intermediate member from the first to the second positions by the input member brings the clutch into alignment with the engagement member;
wherein the clutch is configured to engage with the engagement member when in alignment and the latch mechanism is in the engaged state, to thereby couple the input member to the output member; and
wherein the clutch is configured to disengage from the engagement member when the latch mechanism is in the released state, to thereby allow relative movement between the intermediate member and the output member.

2. The failsafe module according to claim 1, wherein the clutch comprises an input pin and an output pin, whereby the output pin is configured to pivotally mount the clutch to the output member; and wherein the engagement member comprises a block having a groove; and wherein when the input pin is configured to engage with the groove, to thereby couple the input member to the output member; and
wherein the groove extends radially across the block, and comprises two relatively divergent side walls.

3. The failsafe module according to claim 1, wherein the energy storage device applies a linear force between the intermediate member and the output member;
linear movement of the intermediate member relative to the output member from the first position to the second position energizes the energy storage device;
the latch mechanism, in the engaged state, is configured to prevent relative linear movement between the intermediate member and the output member, and, in the released state, allows relative linear movement between the intermediate member and the output member; and
the input member, output member, and the intermediate member are rotatable and coaxial about a common axis and the energy storage device applies the linear force between the intermediate member and the output member in a direction parallel to the common axis.

4. The failsafe module according to claim 3, wherein:
the input member and output member both comprise surfaces extending parallel to the common axis;
the axial surface of the input member defines a circumferential edge extending radially across the axial surface of the input member;
the axial surface of the output member defines an axial edge extending radially across the axial surface of the output member;
the input member and output member are nested and arranged such that the circumferential edge and the axial edge are angled relative to each other and overlap in the radial direction;
the intermediate member comprises an arm extending radially across the circumferential edge and the axial edge, such that movement of the arm is constrained by the circumferential edge and the axial edge; and,
the circumferential edge and the axial edge each have a component parallel to the common axis, such that when the input member is rotated relative to the output member, the constrained movement of the arm by the circumferential edge and the axial edge forces the intermediate member to move linearly relative to the output member between the first and second positions.

5. The failsafe module according to claim 4, wherein the surfaces extending parallel to the common axis are cylindrical tubular walls; and, wherein the circumferential edge of the input member defines an input slot, and the axial edge of the output member defines an output slot; and wherein the output member further comprises the base perpendicular to the common axis, and the energy storage device is engagement between the base and the arm.

6. The failsafe module according to claim 4, wherein one of the circumferential edge and the axial edge is a helical edge that extends helically about the common axis and the other of the circumferential edge and the axial edge is a linear edge that extends parallel to the common axis;
  wherein an angle between the helical edge and a place perpendicular to the common axis decreases along a length of the helical edge in a direction of the intermediate member moving from the first position to the second position.

7. The failsafe module according to claim 1, wherein:
  the latch mechanism comprises the first latch member on the output member and the second latch member on the intermediate member;
  the input member is coupled to the output member via the intermediate member;
  the energy storage device is configured to apply a torque between the intermediate member and the output member;
  rotational movement of the intermediate member relative to the output member from the first position to the second position energises the energy storage device; and
  the latch mechanism, in the engaged state, prevents relative rotational movement between the intermediate member and the output member, and, in the released state, allows relative rotational movement between the intermediate member and the output member.

8. The failsafe module according to claim 7, further comprising a drive arrangement arranged between the intermediate member and the output member, the drive arrangement comprising:
  a first drive element rotatable relative to the intermediate member; and
  a second drive element rotationally fixed relative to the output member and in engagement with the first drive element;
  wherein:
  the energy storage device is engaged between the first drive element and the intermediate member; and
  the intermediate member, the drive arrangement and the output member are engaged such that relative rotational movement between the intermediate member and the output member causes relative rotational movement between the intermediate member and the first drive element to thereby energise the energy storage device.

9. The failsafe module according to claim 8, wherein the first drive element and the second drive element each have a pitch radius that increases by the same amount in a same circumferential direction.

10. The failsafe module according to claim 7, wherein the coupling mechanism comprises a plurality of energy storage devices configured to apply a torque between the intermediate member and the output member;
  the drive arrangement comprises a plurality of first drive elements and each energy storage device of the plurality of energy storage devices is engaged between the intermediate member and a respective first drive element of the plurality of first drive elements; and
  the drive arrangement comprises a plurality of second drive elements and each first drive element of the plurality of first drive elements is engaged with a respective second drive element of the plurality of second drive elements.

11. The failsafe module according to claim 1, further comprising at least one of:
  a damper configured to regulate the rate of movement of the output member when the latch mechanism is released;
  a sensor configured to detect when the latch mechanism is engaged;
  a sensor configured to measure the reaction force of the latch mechanism when the latch mechanism is engaged; and
  a sensor configured to measure the force required to move the intermediate member relative to the output member from the first position to the second position to energize the energy storage device.

12. The failsafe module according to claim 1, wherein one of the input member and the output member comprises a single tab, and the other of the input member and the output member comprises two spaced apart tabs; whereby the single tab is located between the spaced apart tabs, thereby limiting the range of rotation of the input member relative to the output member.

13. The failsafe module according to claim 1, further comprising:
  an outer housing containing at least the input member and the output member, so that the outer housing, input member and output member are co-axial; whereby the outer housing comprises an aperture co-axial with the input member and through which a portion of the input member extends; and whereby a circumferential wall extends axially away from the outer housing around the aperture;
  an actuator having an actuator housing which houses a drive mechanism; the actuator is mountable to the outer housing and configured to engage with the input member, such that the input member is rotatable by the drive mechanism; and,
  a safety mechanism configured to prevent relative rotation between the actuator housing and the outer housing when the actuator is separated from the outer housing; the safety mechanism comprising:
  a cover comprising a surface portion and a skirt portion, whereby the skirt portion extends around an edge of and axially away from the surface portion; and whereby the cover is mounted to the actuator housing via the surface portion, and removably mountable to the outer housing via the skirt portion; the cover is configured such that the skirt portion engages with the circumferential wall of the outer housing when the actuator is mounted to the outer housing, so that the cover and the outer housing are co-axial about the common axis;
  an interlock mechanism configured to act between the circumferential wall of the outer housing and the skirt portion of the cover, such that the actuator housing and outer housing are rotationally fixed when the skirt portion of the cover is engaged with the circumferential wall of the outer housing; and,
  a connector rotationally fixed to the drive mechanism, such that operation of the drive mechanism causes rotation of the connector; and wherein the connector and the cover are co-axial about the common axis;
  wherein:
  the connector comprises a protruding leg, which extends axially away from the connector when the actuator is mounted to the outer housing;
  the portion of the input member extending through the aperture in the outer housing is configured to receive the protruding leg of the connector when the actuator is mounted to the outer housing, thereby rotationally fixing the connector and the input member, so that operation of the drive mechanism causes corresponding rotation of the input member via the connector; and, the length of the skirt portion of the cover is longer than the length of the protruding leg of the connector, so that the protruding leg of the connector disengages from the input member before the skirt portion of the cover disengages from the wall of the outer housing when the actuator is separated from the outer housing, so that the actuator housing and the outer housing remain rotationally fixed by the interlock mechanism until the skirt portion of the cover is completely disengaged from the wall of the outer housing.

14. The failsafe module according to claim 13, wherein the connector is a T-shaped connector comprising a radial leg and an axial leg, whereby the protruding leg is the axial leg; and the portion of the input member extending through the aperture in the outer housing comprises a notch configured to receive the axial leg of the connector when the actuator is mounted to the outer housing, so that operation of the drive mechanism causes corresponding rotation of the input member via the connector; and whereby the axial length of the skirt portion of the cover is longer than the length of the axial leg of the connector.

15. The failsafe module according to claim 14, wherein the interlock mechanism comprises:
a recess located on the inner surface of the skirt portion of the cover and a correspondingly shaped projection extending outwardly from the outer surface of the circumferential wall of the outer housing,
whereby the projection is configured to engage with the recess, such that the actuator housing and outer housing are rotationally fixed.

16. The failsafe module according to claim 15, wherein the projection comprises a cylindrical peg located within a groove in at least one of the inner surface of the skirt portion of the cover and the outer surface of the circumferential wall of the outer housing, whereby a diameter of the peg is greater than a depth of the groove, so that the peg extends in a direction that is one of radially inwardly from the inner surface of the skirt portion of the cover and radially outwardly from the outer surface of the circumferential wall of the outer housing.

17. The failsafe module according to claim 1, further comprising:
a collar comprising an inner part having an axially extending aperture, and an outer part extending radially outwardly from the inner part and substantially around a portion of the circumference of the inner part, whereby the collar is configured to fit around a portion of the input member, such that the input member and the collar are co-axial about a common axis, and the input member and collar are rotationally fixed, when the collar is fitted to the input member; and, a stop located in the rotational path of the outer part when the collar is fitted to the input member, such that rotation of the collar relative to the stop causes a circumferential end of the outer part to engage with the stop, thereby limiting the range of rotation of the collar and thereby the input member;
wherein the outer part comprises a first circumferential end configured to engage with the stop before the energy storage device is energised, thereby preventing rotation of the input member in a first direction while the energy storage device is not energised; and wherein the outer part comprises a second circumferential end configured to move towards the stop as the energy storage device is energised by rotating the input member in a second direction, and whereby rotation of the input member in the first direction and the second direction is permitted by the collar once the energy storage device is energised and the latch mechanism engaged; and
wherein the aperture comprises a lip configured to interlock with a corresponding indent on the input member when the collar is fitted to the input member, thereby preventing relative rotation between the input member and the collar.

18. The failsafe module according to claim 17, further comprising:
a lock nut configured to releasably secure the collar to the input member; the lock nut comprising a head having a unique configuration; and,
a key having a corresponding unique configuration, such that the lock nut is tightened or released only when the key having the corresponding unique configuration engages with and rotates the lock nut, to thereby secure or remove the collar from the input member;
wherein the lip comprises a first fixing hole extending axially through the lip, and the corresponding indent on the input member comprises a floor having a second fixing hole, such that the first and second fixing holes are aligned when the collar is fitted to the input member; and
whereby the collar is secured to the input member when the lock nut is received within the aligned first and second fixing holes and tightened by the key.

19. The failsafe module according to claim 14, wherein the interlock mechanism comprises:
a recess located on the outer surface of the circumferential wall of the outer housing and a correspondingly shaped projection extending inwardly from the inner surface of the skirt portion of the cover,
whereby the projection is configured to engage with the recess, such that the actuator housing and outer housing are rotationally fixed.

20. A failsafe module comprising:
an input member;
an output member movable toward and away from a predetermined position;
a coupling mechanism for coupling the input member to the output member, the coupling mechanism comprising:
an intermediate member engaged with the input member and movable by the input member between a first position and a second position;
an energy storage device acting between the output member and the intermediate member, such that movement of the intermediate member relative to the output member from the first position to the second position energizes the energy storage device, and wherein the energy storage device, the output member, and the intermediate member are engaged such that a release of energy from the energy storage device drives the output member to the predetermined position; and
a latch mechanism having an engaged state in which the latch mechanism prevents relative movement between the intermediate member and the output member when the intermediate member is in the second position, to thereby hold the energy storage device in an energized state and to thereby couple the input member to the output member, and the latch mechanism having a released state in which the latch mechanism allows relative movement between the intermediate member and the output member, to thereby allow the energy storage device to be energized or to release energy;
wherein the latch mechanism comprises a first latch member and a second latch member, wherein the first latch member and the second latch member are configured to couple when the intermediate member is in the second position; and wherein the latch mechanism further comprises a clutch assembly configured to couple the input member to the output member when the latch mechanism is in the engaged state;
wherein:
the latch mechanism comprises the first latch member on the output member and the second latch member on the intermediate member;
the input member is coupled to the output member via the intermediate member;
the energy storage device is configured to apply a torque between the intermediate member and the output member;
rotational movement of the intermediate member relative to the output member from the first position to the second position energises the energy storage device; and
the latch mechanism, in the engaged state, prevents relative rotational movement between the intermediate member and the output member, and, in the released state, allows relative rotational movement between the intermediate member and the output member;
and further comprising a drive arrangement arranged between the intermediate member and the output member, the drive arrangement comprising:
a first drive element rotatable relative to the intermediate member; and
a second drive element rotationally fixed relative to the output member and in engagement with the first drive element;
wherein:
the energy storage device is engaged between the first drive element and the intermediate member; and
the intermediate member, the drive arrangement and the output member are engaged such that relative rotational movement between the intermediate member and the output member causes relative rotational movement between the intermediate member and the first drive element to thereby energise the energy storage device.

21. The failsafe module according to claim 20, wherein the first drive element and the second drive element each have a pitch radius that increases by the same amount in a same circumferential direction.

22. The failsafe module according to claim 20, wherein:
the coupling mechanism comprises a plurality of energy storage devices configured to apply a torque between the intermediate member and the output member;
the drive arrangement comprises a plurality of first drive elements and each energy storage device of the plurality of energy storage devices is engaged between the intermediate member and a respective first drive element of the plurality of first drive elements; and
the drive arrangement comprises a plurality of second drive elements and each first drive element of the plurality of first drive elements is engaged with a respective second drive element of the plurality of second drive elements.

23. A failsafe module comprising:
an input member;
an output member movable toward and away from a predetermined position;
a coupling mechanism for coupling the input member to the output member, the coupling mechanism comprising:
an intermediate member engaged with the input member and movable by the input member between a first position and a second position;
an energy storage device acting between the output member and the intermediate member, such that movement of the intermediate member relative to the output member from the first position to the second position energizes the energy storage device, and wherein the energy storage device, the output member, and the intermediate member are engaged such that a release of energy from the energy storage device drives the output member to the predetermined position; and
a latch mechanism having an engaged state in which the latch mechanism prevents relative movement between the intermediate member and the output member when the intermediate member is in the second position, to thereby hold the energy storage device in an energized state and to thereby couple the input member to the output member, and the latch mechanism having a released state in which the latch mechanism allows relative movement between the intermediate member and the output member, to thereby allow the energy storage device to be energized or to release energy;
an outer housing containing at least the input member and the output member, so that the outer housing, input member and output member are co-axial; whereby the outer housing comprises an aperture co-axial with the input member and through which a portion of the input member extends; and whereby a circumferential wall extends axially away from the outer housing around the aperture;
an actuator having an actuator housing which houses a drive mechanism; the actuator is mountable to the outer housing and configured to engage with the input member, such that the input member is rotatable by the drive mechanism; and,
a safety mechanism configured to prevent relative rotation between the actuator housing and the outer housing when the actuator is separated from the outer housing; the safety mechanism comprising:
a cover comprising a surface portion and a skirt portion, whereby the skirt portion extends around an edge of and axially away from the surface portion; and whereby the cover is mounted to the actuator housing via the surface portion, and removably mountable to the outer housing via the skirt portion; the cover is configured such that the skirt portion engages with the circumferential wall of the outer housing when the actuator is mounted to the outer housing, so that the cover and the outer housing are co-axial about the common axis;
an interlock mechanism configured to act between the circumferential wall of the outer housing and the skirt portion of the cover, such that the actuator housing and outer housing are rotationally fixed when the skirt portion of the cover is engaged with the circumferential wall of the outer housing; and,
a connector rotationally fixed to the drive mechanism, such that operation of the drive mechanism causes rotation of the connector; and wherein the connector and the cover are co-axial about the common axis;

wherein:
the connector comprises a protruding leg, which extends axially away from the connector when the actuator is mounted to the outer housing;
the portion of the input member extending through the aperture in the outer housing is configured to receive the protruding leg of the connector when the actuator is mounted to the outer housing, thereby rotationally fixing the connector and the input member, so that operation of the drive mechanism causes corresponding rotation of the input member via the connector; and,
the length of the skirt portion of the cover is longer than the length of the protruding leg of the connector, so that the protruding leg of the connector disengages from the input member before the skirt portion of the cover disengages from the wall of the outer housing when the actuator is separated from the outer housing, so that the actuator housing and the outer housing remain rotationally fixed by the interlock mechanism until the skirt portion of the cover is completely disengaged from the wall of the outer housing.

24. The failsafe module according to claim 23, wherein the connector is a T-shaped connector comprising a radial leg and an axial leg, whereby the protruding leg is the axial leg; and the portion of the input member extending through the aperture in the outer housing comprises a notch configured to receive the axial leg of the connector when the actuator is mounted to the outer housing, so that operation of the drive mechanism causes corresponding rotation of the input member via the connector; and whereby the axial length of the skirt portion of the cover is longer than the length of the axial leg of the connector.

25. The failsafe module according to claim 23, wherein the interlock mechanism comprises:
a recess located on the inner surface of the skirt portion of the cover and a correspondingly shaped projection extending outwardly from the outer surface of the circumferential wall of the outer housing,
whereby the projection is configured to engage with the recess, such that the actuator housing and outer housing are rotationally fixed.

26. The failsafe module according to claim 23, wherein the interlock mechanism comprises:
a recess located on the outer surface of the circumferential wall of the outer housing and a correspondingly shaped projection extending inwardly from the inner surface of the skirt portion of the cover,
whereby the projection is configured to engage with the recess, such that the actuator housing and outer housing are rotationally fixed.

27. The failsafe module according to claim 25, wherein the projection comprises a cylindrical peg located within a groove in at least one of the inner surface of the skirt portion of the cover and the outer surface of the circumferential wall of the outer housing, whereby a diameter of the peg is greater than a depth of the groove, so that the peg extends in a direction that is one of radially inwardly from the inner surface of the skirt portion of the cover and radially outwardly from the outer surface of the circumferential wall of the outer housing.

* * * * *